United States Patent
Rugeland et al.

(10) Patent No.: US 12,004,249 B2
(45) Date of Patent: Jun. 4, 2024

(54) FLEXIBLE RESUME AND RECONFIGURATIONS IN MULTI-RADIO DUAL CONNECTIVITY AND STANDALONE SCENARIOS

(71) Applicant: TELEFONAKTIEBOLAGET LM ERICSSON (PUBL), Stockholm (SE)

(72) Inventors: Patrik Rugeland, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 607 days.

(21) Appl. No.: 17/271,446

(22) PCT Filed: Sep. 27, 2019

(86) PCT No.: PCT/IB2019/058255
§ 371 (c)(1),
(2) Date: Feb. 25, 2021

(87) PCT Pub. No.: WO2020/065622
PCT Pub. Date: Apr. 2, 2020

(65) Prior Publication Data
US 2021/0337615 A1    Oct. 28, 2021

Related U.S. Application Data

(60) Provisional application No. 62/737,656, filed on Sep. 27, 2018.

(51) Int. Cl.
*H04W 76/16* (2018.01)
*H04W 76/27* (2018.01)
*H04W 76/30* (2018.01)

(52) U.S. Cl.
CPC .......... *H04W 76/16* (2018.02); *H04W 76/27* (2018.02); *H04W 76/30* (2018.02)

(58) Field of Classification Search
CPC ...... H04W 76/16; H04W 76/30; H04W 76/27
See application file for complete search history.

(56) References Cited

U.S. PATENT DOCUMENTS

2019/0254102 A1* 8/2019 Teyeb .................. H04W 76/27
2021/0274587 A1* 9/2021 Jung .................. H04W 12/0433
(Continued)

OTHER PUBLICATIONS

3rd Generation Partnership Project, "3rd Generation Partnership Project; Technical Specification Group Radio Access Network; NR; Radio Resource Control (RRC) protocol specification (Release 15)", Technical Specification, 3GPP TS 38.331 V15.3.0, pp. 1-445, Sep. 1, 2018, 3GPP, France.
(Continued)

*Primary Examiner* — Ajay Cattungal
(74) *Attorney, Agent, or Firm* — Sage Patent Group

(57) ABSTRACT

A method is provided by a wireless device for performing reconfiguration and/or resumption of a radio resource control, RRC, connections while operating in a Multi-RAT Dual Connectivity, MR-DC or standalone New Radio, NR, environment. The method includes suspending the wireless device to an inactive mode. The method further includes resuming operation of the wireless device from the inactive mode. The method further includes receiving an indication to perform one of: releasing a master cell group and perform a configuration on at least one of one or more radio bearer configurations and a secondary cell group configuration; or releasing configurations for a master cell group and a secondary cell group and perform the configuration on one or more radio bearer configurations.

13 Claims, 21 Drawing Sheets

(56) References Cited

U.S. PATENT DOCUMENTS

| | | | | |
|---|---|---|---|---|
| 2021/0345434 A1* | 11/2021 | Wu | ....................... | H04W 76/19 |
| 2022/0369409 A1* | 11/2022 | Teyeb | ................... | H04W 76/25 |
| 2023/0164871 A1* | 5/2023 | Jung | ................ | H04W 12/0433 |
| | | | | 370/328 |

OTHER PUBLICATIONS

HTC et al., "Support of full configuration per CG", 3GPP TSG-RAN WG2#99bis, Prague, Czech Republic, Oct. 9-13, 2017, pp. 1-5, R2-1711666, 3GPP.

Interdigital Inc., "Dual Connectivity Configuration in INACTIVE for MR-DC", 3GPP TSG-RAN WG2 Meeting #103, Gothenburg, Sweden, Aug. 20-24, 2018, pp. 1-5, R2-1811461, 3GPP.

\* cited by examiner

FLEXIBLE RESUME AND RECONFIGURATIONS IN MULTI-RADIO DUAL CONNECTIVITY AND STANDALONE SCENARIOS

CROSS-REFERENCE TO RELATED APPLICATIONS

The present application claims the benefit of U.S. Provisional Application No. 62/737,656, filed on Sep. 27, 2018, the disclosure of which is hereby incorporated in its entirety by reference. The present application is also related to U.S. Provisional Application No. 62/587,171 entitled "FULL RRC CONFIGURATION IN EN-DC" filed Nov. 16, 2017, the disclosures of which are hereby incorporated herein in its entirety by reference.

TECHNICAL FIELD

The present disclosure relates generally to communications, and more particularly to communication methods and related devices and nodes in a telecommunications network.

BACKGROUND

Introduction

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Long Term Evolution (LTE) and New Radio/Evolved Packet System (NR/EPS) and 5G System (5GS)

There are different ways to deploy a 5G network with or without interworking with LTE (also referred to as Evolved Universal Terrestrial Radio Access (E-UTRA)) and evolved packet core (EPC), as depicted in FIG. 1. In principle, NR and LTE can be deployed without any interworking, denoted by NR stand-alone (SA) operation, that is gNB in NR can be connected to the 5G core network (5GC) and eNB can be connected to EPC with no interconnection between the two (Option 1 and Option 2 in FIG. 1). On the other hand, the first supported version of NR is the so-called EN-DC (Evolved Universal Terrestrial Radio Access Network (E-UTRAN)-NR Dual Connectivity), illustrated by Option 3 in FIG. 1. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 in FIG. 1 (also known as eLTE, E-UTRA/5GC, or LTE/5GC). In these cases, both NR and LTE are seen as part of the NG-RAN. It is worth noting that, Option 4/4A and option 7/7A illustrated in FIG. 1 are other variants of dual connectivity between LTE and NR which will be standardized as part of NG-RAN connected to 5GC, denoted by MR-DC (Multi-Radio Dual Connectivity). Option 6 and 8, where gNB is connected to EPC (with and without interconnectivity to LTE) are also possible, although they seem to be less practical and hence they will not be pursued further in 3GPP.

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group (i.e. master cell group (MCG) and secondary cell group (SCG)) and dual connectivity between nodes on same RAT (e.g. NR-NR DC). For the LTE cells, a consequence of these different deployments is the co-existence of LTE cells associated to eNBs connected to EPC, 5GC or both EPC/5GC.

RRC Resume

When a user equipment (UE) is suspended from RRC_CONNECTED to RRC_INACTIVE, it suspends all communication, but maintains its configuration to be able to more rapidly resume the connection when needed.

When the UE resumes in NR, the UE transmits a Resume request message (RRCResumeRequest or RRCResumeRequest1) and the network can reply with a RRCResume message. The UE then responds with a RRCResumeComple message and the UE enters RRC_CONNECTED. An example sequence is illustrated in FIG. 2.

The RRCResumeRequest message (which could either be RRCResumeRequest or RRCResumeRequest1) contains a UE identifier and a resume cause so that the network can locate the UEs stored Access Stratum (AS) context and provide appropriate response depending on the resume cause (e.g. location updates using 'mo-signaling', starting a data session using 'mo-data', or an emergency call, etc.). To prevent a rogue user from impersonating the UE, the resume request also contains a shortened MAC-I (a security token) which verifies the UE identity.

The RRCResume message contains the configuration(s) the UE needs to enter RRC_CONNECTED, namely the RadioBearerConfig, containing the packet data convergence protocol (PDCP) and service data adaptation protocol (SDAP) configurations, the masterCellGroup, containing the Medium Access Control (MAC), Radio Link Control (RLC) and physical (PHY) layer configurations, as well as the measurement configurations (measConfig). In addition, the RRCResume message contains a 'full configuration' flag, which will indicate to the UE that it shall release all its stored configuration and apply the new received configurations.

The RRCResumeComplete message may contain e.g. NAS (Non-Access Stratum) messages, selected PLMN (public land mobile network) identity, and Tx Direct Current locations for the configured serving cells and BWPs.

The messages as specified in TS 38.331 v15.3.0 (2018-09-27) are shown below.

RRC Resume Request Messages from 38.331:

```
RRCResumeRequest message
-- ASN1START
-- TAG-RRCRESUMEREQUEST-START
RRCResumeRequest ::=                SEQUENCE {
    rrcResumeRequest                    RRCResumeRequest-IEs
}
RRCResumeRequest-IEs ::=            SEQUENCE {
  resumeIdentity                      ShortI-RNTI-Value,
  resumeMAC-I                         BIT STRING (SIZE (16)),
  resumeCause                         ResumeCause,
  spare                               BIT STRING (SIZE (1))
}
-- TAG-RRCRESUMEREQUEST-STOP
-- ASN1STOP
RRCResumeRequest1
-- ASN1START
-- TAG-RRCRESUMEREQUEST1-START
RRCResumeRequest1 ::= SEQUENCE {
    rrcResumeRequest1           RRCResumeRequest1-IEs
}
RRCResumeRequest1-IE ::=        SEQUENCE {
  resumeIdentity                    I-RNTI-Value,
  resumeMAC-I                       BIT STRING (SIZE (16)),
  resumeCause                       ResumeCause,
  spare                             BIT STRING (SIZE (1))
}
-- TAG-RRCRESUMEREQUEST1-STOP
-- ASN1STOP
RRCResume message
-- ASN1START
-- TAG-RRCRESUME-START
RRCResume ::=                       SEQUENCE {
  rrc-TransactionIdentifier             RRC-TransactionIdentifier,
  criticalExtensions                    CHOICE {
      rrcResume                             RRCResume-IEs,
      criticalExtensionsFuture              SEQUENCE { }
  }
}
RRCResume-IEs ::=                   SEQUENCE {
  radioBearerConfiq                   RadioBearerConfig
OPTIONAL, -- Need M
  masterCellGroup                     OCTET STRING (CONTAINING CellGroupConfig)
OPTIONAL, -- Need M
  measConfig                          MeasConfig
OPTIONAL, -- Need M
  fullConfig                          ENUMERATED {true}
OPTIONAL, -- Need N
  lateNonCriticalExtension            OCTET STRING
OPTIONAL,
  nonCriticalExtension                SEQUENCE{ }
OPTIONAL
}
-- TAG-RRCRESUME-STOP
-- ASN1STOP
RRCResumeComplete
-- ASN1START
-- TAG-RRCRESUMECOMPLETE-START
RRCResumeComplete ::=               SEQUENCE {
  rrc-TransactionIdentifier             RRC-TransactionIdentifier,
  criticalExtensions                    CHOICE {
      rrcResumeComplete                     RRCResumeComplete-IEs,
      criticalExtensionsFuture              SEQUENCE { }
  }
}
RRCResumeComplete-IEs ::=           SEQUENCE {
  dedicatedNAS-Message                  DedicatedNAS-Message    OPTIONAL,
  selectedPLMN-Identity                 INTEGER (1..maxPLMN)    OPTIONAL,
  uplinkTxDirectCurrentList                     UplinkTxDirectCurrentList
OPTIONAL,
  lateNonCriticalExtension                          OCTET   STRING
OPTIONAL,
  nonCriticalExtension                              SEQUENCE{ }
OPTIONAL
}
-- TAG-RRCRESUMECOMPLETE-STOP
-- ASN1STOP
RRCResumeComplete message
-- ASN1START
-- TAG-RRCRESUMECOMPLETE-START
```

```
RRCResumeComplete ::=                       SEQUENCE {
    rrc-TransactionIdentifier                   RRC-TransactionIdentifier,
    criticalExtensions                          CHOICE {
        rrcResumeComplete                           RRCResumeComplete-IEs,
        criticalExtensionsFuture                    SEQUENCE { }
    }
}
RRCResumeComplete-IEs ::=                   SEQUENCE {
    dedicatedNAS-Message                        DedicatedNAS-Message        OPTIONAL,
    selectedPLMN-Identify                       INTEGER (1..maxPLMN)        OPTIONAL,
    uplinkTxDirectCurrentList                   UplinkTxDirectCurrentList
OPTIONAL,
    lateNonCriticalExtension                    OCTET STRING
OPTIONAL,
    nonCriticalExtension                        SEQUENCE{ }
OPTIONAL
}
-- TAG-RRCRESUMECOMPLETE-STOP
-- ASN1STOP
RRCConnectionResume message in E-UTRA (TS 36.331 v15.3.0)
-- ASN1START
RRCConnectionResume-r13 ::=     SEQUENCE {
    rrc-TransactionIdentifier                   RRC-TransactionIdentifier,
    criticalExtensions                          CHOICE {
        c1                                          CHOICE {
            rrcConnectionResume-r13                     RRCConnectionResume-r13-IEs,
            spare3                                      NULL,
            spare2                                      NULL,
            spare1                                      NULL
        },
        criticalExtensionsFuture                    SEQUENCE { }
    }
}
RRCConnectionResume-r13-IEs ::=             SEQUENCE {
    radioResourceConfigDedicated-r13            RadioResourceConfigDedicated OPTIONAL, -- Need
ON
    nextHopChainingCount-r13                    NextHopChainingCount,
    measConfig-r13                              MeasConfig
OPTIONAL, -- Need ON
    antennaInfoDedicatedPCell-r13               AntennaInfoDedicated-v10i0 OPTIONAL, --
Need ON
    drb-ContinueROHC-r13                        ENUMERATED {true}
OPTIONAL, -- Need OP
    lateNonCriticalExtension                    OCTET STRING
OPTIONAL,
    rrcConnectionResume-v1430-IEs               RRCConnectionResume-v1430-IEs OPTIONAL
}
RRCConnectionResume-v1430-IEs ::= SEQUENCE {
    otherConfig-r14                             OtherConfig-r9
OPTIONAL, -- Need ON
    rrcConnectionResume-v1510-IEs           RRCConnectionResume-v1510-IEs OPTIONAL
}
RRCConnectionResume-v1510-IEs ::= SEQUENCE {
    sk-Counter-r15                              INTEGER (0.. 65535)
OPTIONAL, -- Need ON
    nr-RadioBearerConfig1-r15               OCTET STRING                OPTIONAL, --
Need ON
    nr-RadioBearerConfig2-r15               OCTET STRING                OPTIONAL, --
Need ON
    nonCriticalExtension                        RRCConnectionResume-v1530-IEs
        OPTIONAL
}
RRCConnectionResume-v1530-IEs ::=SEQUENCE {
    fullConfig-r15                              ENUMERATED {true} OPTIONAL, --
Need ON
    nonCriticalExtension                        SEQUENCE { }                OPTIONAL
}
-- ASN1STOP
```

Dual Connectivity Options

In TS 36.300, dual connectivity is defined for intra-E-UTRA Dual Connectivity (DC) as depicted in FIG. 3, which highlights the C-plane and U-Plane connectivity. Both MeNB and SeNB are E-UTRA nodes, with an EPC Core Network (CN) entity.

In TS 37.340, dual connectivity is further defined for Multi-RAT Dual Connectivity (MR-DC), which implies in having a UE configured with two different nodes—one providing E-UTRA access and the other one providing NR access. The CN entity associated to MR-DC can be either EPC or 5GC, which divides MR-DC cases in:

E-UTRA-NR Dual Connectivity (EN-DC), comprised in EPS, as a master node (MN) eNB and an en-gNB as a secondary node (SN) (en-gNB refers to a gNB that is operating in a non-standalone mode operating as the SN);

NG-RAN E-UTRA-NR Dual Connectivity (NGEN-DC), comprised in 5GS, as a MN ng-eNB (ng-eNB refers to LTE eNB connected to 5GC) and a gNB as the SN;

NR-E-UTRA Dual Connectivity (NE-DC), comprised in 5GS, as a MN gNB and an ng-eNB as the SN;

A gNB or ng-eNB are collectively referred to as NG-RAN node.

C-plane and U-Plane connectivity for EN-DC case is depicted in FIG. 4. The MR-DC case associated with 5GC is depicted in FIG. 5.

Besides MR-DC definition, the dual connectivity case where the MN and SN are NR nodes is called NR-NR-DC, which is agreed in RAN 2 meeting to be covered in TS 37.340. C-plane and U-Plane connectivity for NR-NR-DC can be depicted by FIG. 5, as in the case of MR-DC associated with 5GC.

EN-DC Configurations

To configure the UE with EN-DC (i.e. an E-UTRA eNB as MN and a NR gNB as SN connected to EPC), the UE receives a RRCConnectionReconfiguration message, including the nr-Config IE:

```
RRCConnectionReconfiguration-v1510-IEs ::= SEQUENCE {
    nr-Config-r15                           CHOICE {
        release                                 NULL,
        setup                                   SEQUENCE {
            endc-ReleaseAndAdd-r15                  BOOLEAN,
            nr-SecondaryCellGroupConfig-r15         OCTET STRING
    OPTIONAL,    -- Need ON
            p-MaxEUTRA-r15                          P-Max
    OPTIONAL    -- Need ON
        }
    }                                       OPTIONAL, -- Need ON
    sk-Counter-r15                          INTEGER (0.. 65535)
    OPTIONAL,    -- Need ON
    nr-RadioBearerConfig1-r15               OCTET STRING
    OPTIONAL,    -- Need ON
    nr-RadioBearerConfig2-r15               OCTET STRING
    OPTIONAL,    -- Need ON
    tdm-PatternConfig-r15                   CHOICE {
        release                                 NULL,
        setup                                   SEQUENCE {
            subframeAssignment-r15                  SubframeAssignment-r15,
            harq-Offset-r15                         INTEGER (0.. 9)
        }
    }
        OPTIONAL,    -- Cond FDD-PCell
    nonCriticalExtension                    RRCConnectionReconfiguration-v1530-IEs
OPTIONAL
}
RRCConnectionReconfiguration-v1530-IEs ::= SEQUENCE {
    securityConfigHO-v1530                  SecurityConfigHO-v1530
OPTIONAL,    -- Cond HO-5GC
    nonCriticalExtension                    RRCConnectionReconfiguration-v1530-IEs OPTIONAL
}
```

As can be noted, the EN-DC configurations contain the nr-SecondaryCellGroupConfig (containing the lower layer configurations in the CellGroupConfig) and two RadioBearerConfigs (containing the higher layer configurations, i.e. PDCP and SDAP configurations). These fields are defined in NR RRC specification TS 38.331 (v15.3.0-2018-09-26) as seen below.

RadioBearerConfig information element

```
-- ASN1START
-- TAG-RADIO-BEARER-CONFIG-START
RadioBearerConfig ::=           SEQUENCE {
    srb-ToAddModList                SRB-ToAddModList                                    OPTIONAL,
-- Cond HO-Conn
    srb3-ToRelease                  ENUMERATED{true}                                    OPTIONAL,
```

-continued

| RadioBearerConfig information element | | |
|---|---|---|
| -- Need N | | |
|   drb-ToAddModList | DRB-ToAddModList | OPTIONAL, |
| -- Cond HO-toNR | | |
|   drb-ToReleaseList | DRB-ToReleaseList | OPTIONAL, |
| -- Need N | | |
|   securityConfig | SecurityConfig | OPTIONAL, |
| -- Need M | | |
|   ... | | |
| } | | |
| SRB-ToAddModList : := | SEQUENCE (SIZE (1 . . 2) ) OF SRB-ToAddMod | |
| SRB-ToAddMod : := | SEQUENCE { | |
|   srb-Identity | SRB-Identity, | |
|   reestablishPDCP | ENUMERATED{true} | OPTIONAL, |
| -- Need N | | |
|   discardOnPDCP | ENUMERATED{true} | OPTIONAL, |
| -- Need N | | |
|   pdcp-Config | PDCP-Config | OPTIONAL, |
| -- Cond PDCP | | |
|   ... | | |
| } | | |
| DRB-ToAddModList : := | SEQUENCE (SIZE (1 . . maxDRB) ) OF<br>DRB-ToAddMod | |
| DRB-ToAddMod : := | SEQUENCE { | |
|   cnAssociation | CHOICE { | |
|     eps-BearerIdentity | INTEGER (0 . . 15), | - |
| - EPS-DRB-Setup | | |
|     sdap-Config | SDAP-Config | - |
| - 5GC | | |
|   } | OPTIONAL, -- Cond DRBSetup | |
|   drb-Identity | DRB-Identity, | |
|   reestablishPDCP | ENUMERATED{true} | OPTIONAL, |
| -- Need N | | |
|   recoverPDCP | ENUMERATED{true} | OPTIONAL, |
| -- Need N | | |
|   pdcp-Config | PDCP-Config | OPTIONAL, |
| -- Cond PDCP | | |
|   ... | | |
| } | | |
| DRB-ToReleaseList : := | SEQUENCE (SIZE (1 . . maxDRB) ) OF<br>DRB-Identity | |
| SecurityConfig : := | SEQUENCE { | |
|   securityAlgorithmConfig | SecurityAlgorithmConfig | OPTIONAL, |
| -- Cond RBTermChange | | |
|   keyToUse | ENUMERATED{master, secondary} | OPTIONAL, |
| -- Cond RBTermChange | | |
|   ... | | |
| } | | |
| -- TAG-RADIO-BEARER-CONFIG-STOP | | |
| -- ASN1STOP | | |
| CellGroupConfig information element | | |
| -- ASN1START | | |
| -- TAG-CELL-GROUP-CONFIG-START | | |
| -- Configuration of one Cell-Group: | | |
| CellGroupConfig : := | SEQUENCE { | |
|   cellGroupId | CellGroupId, | |
|   rlc-BearerToAddModList | SEQUENCE (SIZE(1 . .maxLC-ID) ) OF<br>RLC-BearerConfig | |
| OPTIONAL, -- Need N | | |
|   rlc-BearerToReleaseList | SEQUENCE (SIZE (1 . .maxLC-ID) ) OF<br>LogicalChannelIdentity | |
| OPTIONAL, -- Need N | | |
|   mac-CellGroupConfig | | MAC-CellGroupConfig |
| OPTIONAL, -- Need M | | |
|   physicalCellGroupConfig | | PhysicalCellGroupConfig |
| OPTIONAL, -- Need M | | |
|   spCellConfig | | SpCellConfig |
| OPTIONAL, -- Need M | | |
|   sCellToAddModList | SEQUENCE (SIZE (1 . .maxNrofSCells) ) OF<br>SCellConfig | |
| OPTIONAL, -- Need N | | |
|   sCellToReleaseList | SEQUENCE (SIZE (1 . .maxNrofSCells) ) OF<br>SCellIndex | |
| OPTIONAL, -- Need N | | |
|   ... , | | |

| RadioBearerConfig information element |
|---|

```
    [ [
    reportUplinkTxDirectCurrent-v15xy                                               ENUMERATED {true}
OPTIONAL -- Cond BWP-Reconfig
    ] ]
}
-- Serving cell specific MAC and PHY parameters for a SpCell:
SpCellConfig : :=                       SEQUENCE {
    servCellIndex                                                                   ServCellIndex
OPTIONAL, -- Cond SCG
    reconfigurationWithSync                                                         ReconfigurationWithSync
OPTIONAL, -- Cond ReconfWithSync
    rlf-TimersAndConstants              SetupRelease { RLF-TimersAndConstants }
OPTIONAL, -- Need M
    rlmInSyncOutOfSyncThreshold         ENUMERATED {n1}                             OPTIONAL, -
- Need S
    spCellConfigDedicated                                                           ServingCellConfig
OPTIONAL, -- Need M
    ...
}
ReconfigurationWithSync : :=            SEQUENCE {
    spCellConfigCommon                                                              ServingCellConfigCommon
OPTIONAL, -- Need M
    newUE-Identity                      RNTI-Value,
    t304                                ENUMERATED {ms50, ms100, ms150, ms200,
                                        ms500, ms1000,
ms2000, ms10000},
    rach-ConfigDedicated                CHOICE {
        uplink                              RACH-ConfigDedicated,
        supplementaryUplink                 RACH-ConfigDedicated
    }                                                                               OPTIONAL,
-- Need N
    ...,
    [ [
    smtc                                SSB-MTC                                     OPTIONAL
-- Need S
    ] ]
}
SCellConfig : :=                        SEQUENCE {
    sCellIndex                          SCellIndex,
    sCellConfigCommon                                                               ServingCellConfigCommon
OPTIONAL, -- Cond SCellAdd
    sCellConfigDedicated                                                            ServingCellConfig
OPTIONAL, -- Cond SCellAddMod
    ...,
    [ [
    smtc                                SSB-MTC                                     OPTIONAL
-- Need S
    ] ]
}
-- TAG-CELL-GROUP-CONFIG-STOP
-- ASN1STOP
```

SUMMARY

According to yet other embodiments of inventive concepts, a method performed by a wireless device for performing reconfiguration and/or resumption of a radio resource control, RRC, connections while operating in a Multi-RAT Dual Connectivity, MR-DC environment is provided. The method includes suspending the wireless device to an inactive mode. The method further includes resuming operation of the wireless device from the inactive mode. The method further includes receiving an indication to perform one of: releasing a master cell group and perform a configuration on at least one of one or more radio bearer configurations and a secondary cell group configuration or releasing configurations for a master cell group and a secondary cell group and perform a configuration on one or more radio bearer configurations.

A potential advantage obtained is that in MR-DC scenarios, a flexible approach is provided to resume or reconfigure (including handover) the UE such as full configuration (on both the MCG and SCG lower layer and higher layer configurations), full configuration (on both the MCG and SCG lower layer) but keep or perform delta configuration on MCG/SCG higher layer configurations), full configuration on the SCG lower layer, while keeping or performing delta configuration on the MCG lower layer and MCG/SCG higher layer configurations, and/or full configuration on the MCG lower layer, while keeping or performing delta configuration on the SCG lower layer and MCG/SCG higher layer configurations.

According to other embodiments of inventive concepts, a method performed by a wireless device for performing reconfiguration and/or resumption of a radio resource control, RRC, connections while operating in a Multi-RAT Dual Connectivity, MR-DC or standalone New Radio, NR, environment is provided. The method includes receiving a reconfiguration indication to release a configuration for the secondary cell group and perform a configuration on at least one of one or more radio bearer configurations and a master cell group configuration. The method includes responsive to receiving the reconfiguration indication: releasing the configuration for the secondary cell group and performing the configuration on the at least one of the one or more radio bearer configurations and the master cell group configuration.

According to further embodiments of inventive concepts, a method performed by a wireless device for performing reconfiguration and/or resumption of a radio resource control, RRC, connections while operating in a Multi-RAT Dual Connectivity, MR-DC environment is provided. The method includes receiving a reconfiguration indication to release a master cell group and perform a configuration on at least one of one or more radio bearer configurations and a secondary cell group configuration. The method further includes responsive to receiving the reconfiguration indication: releasing the master cell group and performing the configuration on the at least one of the one or more radio bearer configurations and the secondary cell group configuration.

According to other embodiments of inventive concepts, a method performed by a wireless device for performing reconfiguration and/or resumption of a radio resource control, RRC, connections while operating in a Multi-RAT Dual Connectivity, MR-DC environment is provided. The method includes receiving a reconfiguration indication to release configurations for a master cell group and a secondary cell group and perform a configuration on one or more radio bearer configurations. The method further includes responsive to receiving the reconfiguration indication: releasing the master cell group and performing the configuration on the one or more radio bearer configurations.

According to other embodiments of inventive concepts, a method is provided by a wireless device for performing reconfiguration and/or resumption of a radio resource control, RRC, connections while operating in a Multi-RAT Dual Connectivity, MR-DC or standalone New Radio, NR, environment. The method includes suspending the wireless device to an inactive mode. The method further includes resuming operation of the wireless device from the inactive mode. The method further includes receiving an indication to release a configuration for a secondary cell group and perform a configuration on at least one of one or more radio bearer configurations and a master cell group configuration. The method further includes responsive to receiving the indication: releasing the configuration for the secondary cell group and performing the configuration on the at least one of the one or more radio bearer configurations and the master cell group configuration.

According to further embodiments of inventive concepts, a method performed by a base station for performing reconfiguration and/or resumption of a connection for a wireless device is provided. The method includes receiving a resume request message from the wireless device while the wireless device is operating in an inactive mode. The method further includes providing, to the wireless device, a resume message including an indication to resume operation and to perform one or more of the following: release a configuration for a secondary cell group and perform a configuration on at least one of one or more radio bearer configurations and a master cell group configuration; release a master cell group and perform a configuration on at least one of one or more radio bearer configurations and a secondary cell group configuration; and/or release configurations for a master cell group and a secondary cell group and perform a configuration on one or more radio bearer configurations.

According to yet other embodiments of inventive concepts, a method performed by a base station for performing reconfiguration and/or resumption of a connection for a wireless device is provided. The method includes deciding to reconfigure the wireless device. The method further includes providing, to the wireless device, a reconfigure message including an indication to resume operation and to perform one or more of the following: release a configuration for a secondary cell group and perform a configuration on at least one of one or more radio bearer configurations and a master cell group configuration; release a master cell group and perform a configuration on at least one of one or more radio bearer configurations and a secondary cell group configuration; and/or release configurations for a master cell group and a secondary cell group and perform a configuration on one or more radio bearer configurations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 6:
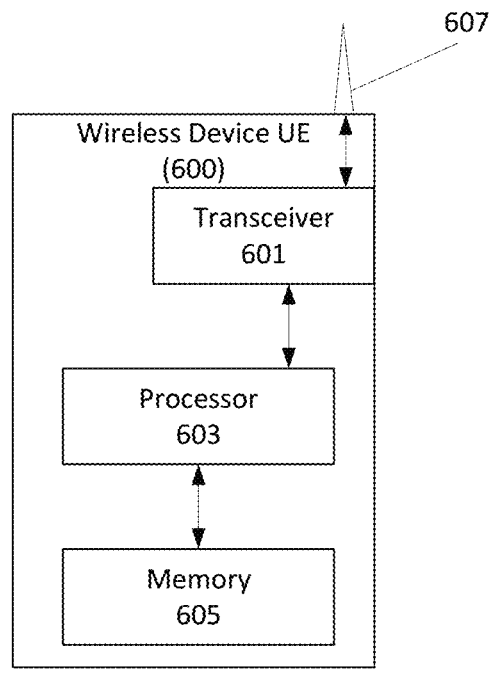
FIG. 6 is a is a block diagram illustrating a user equipment according to some embodiments.

FIG. 6 is a block diagram illustrating elements of a wireless device UE 600 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 600 may be provided, for example, as discussed below with respect to wireless device QQ110 of FIG. 14.) As shown, wireless device UE may include an antenna 607 (e.g., corresponding to antenna QQ111 of FIG. 14), and transceiver circuitry 601 (also referred to as a transceiver, e.g., corresponding to interface QQ114 of FIG. 14) including a transmitter and a receiver configured to provide uplink and downlink radio communications with a base station(s) (e.g., corresponding to network node QQ160 of FIG. 14) of a radio access network. Wireless device UE may also include processing circuitry 603 (also referred to as a processor, e.g., corresponding to processing circuitry QQ120 of FIG. 14) coupled to the transceiver circuitry, and memory circuitry 605 (also referred to as memory, e.g., corresponding to device readable medium QQ130 of FIG. 14) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required. Wireless device UE may also include an interface (such as a user interface) coupled with processing circuitry 603, and/or wireless device UE may be incorporated in a vehicle.

As discussed herein, operations of wireless device UE may be performed by processing circuitry 603 and/or transceiver circuitry 601. For example, processing circuitry 603 may control transceiver circuitry 601 to transmit communications through transceiver circuitry 601 over a radio interface to a radio access network node (also referred to as a base station) and/or to receive communications through transceiver circuitry 601 from a RAN node over a radio interface. Moreover, modules may be stored in memory circuitry 605, and these modules may provide instructions so that when instructions of a module are executed by processing circuitry 603, processing circuitry 603 performs respective operations (e.g., operations discussed below with respect to Example Embodiments relating to wireless devices).

Figure 7:
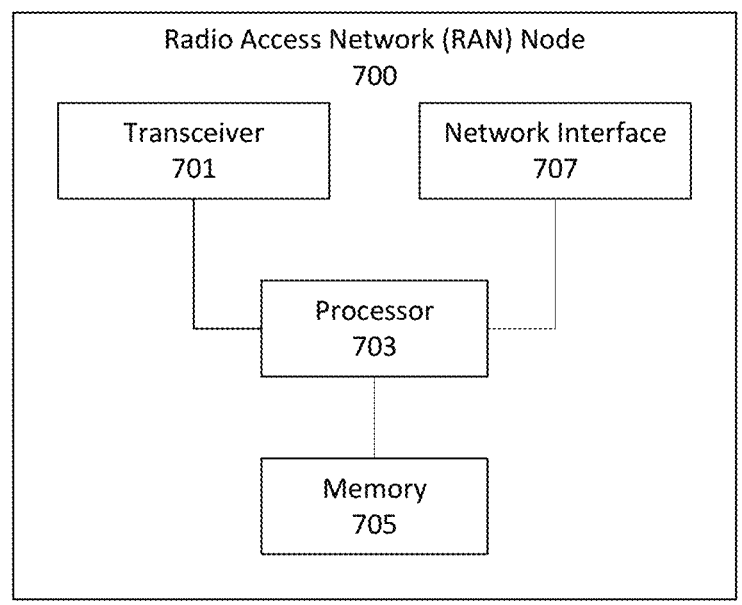
FIG. 7 is a block diagram illustrating a radio access network (RAN) node according to some embodiments.
Figure 8:
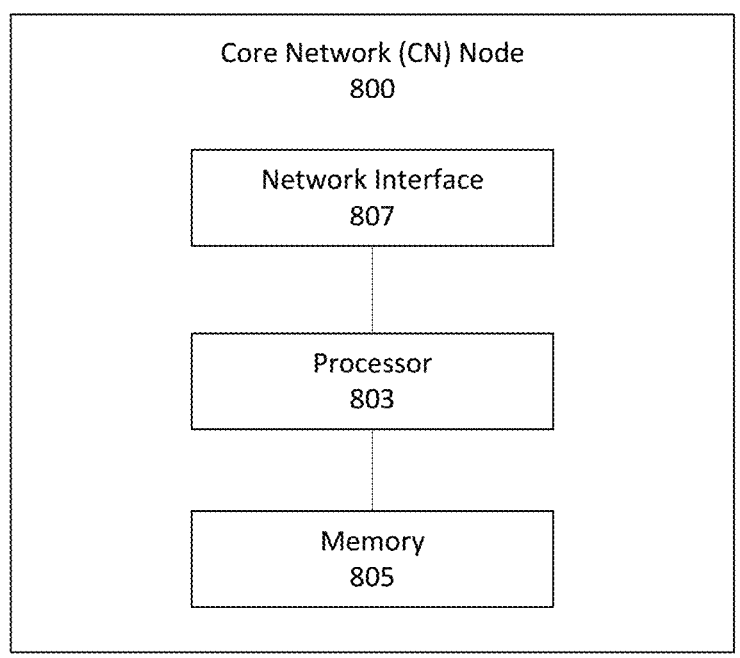
FIG. 8 is a block diagram illustrating a core network (CN) node according to some embodiments.

FIG. 7 is a block diagram illustrating elements of a radio access network RAN node 700 (also referred to as a network node, base station, eNodeB/eNB, gNodeB/gNB, etc.) of a Radio Access Network (RAN) configured to provide cellular communication according to embodiments of inventive concepts. (RAN node 700 may be provided, for example, as discussed below with respect to network node QQ160 of FIG. 14.) As shown, the RAN node may include transceiver circuitry 701 (also referred to as a transceiver, e.g., corresponding to portions of interface QQ190 of FIG. 14) including a transmitter and a receiver configured to provide uplink and downlink radio communications with mobile terminals. The RAN node may include network interface circuitry 707 (also referred to as a network interface, e.g., corresponding to portions of interface QQ190 of FIG. 14) configured to provide communications with other nodes (e.g., with other base stations) of the RAN and/or core network CN. The network node may also include a processing circuitry 703 (also referred to as a processor, e.g., corresponding to processing circuitry QQ170) coupled to the transceiver circuitry, and a memory circuitry 705 (also referred to as memory, e.g., corresponding to device readable medium QQ180 of FIG. 14) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the RAN node may be performed by processing circuitry 703, network interface 407, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 703, processing circuitry 703 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 1:
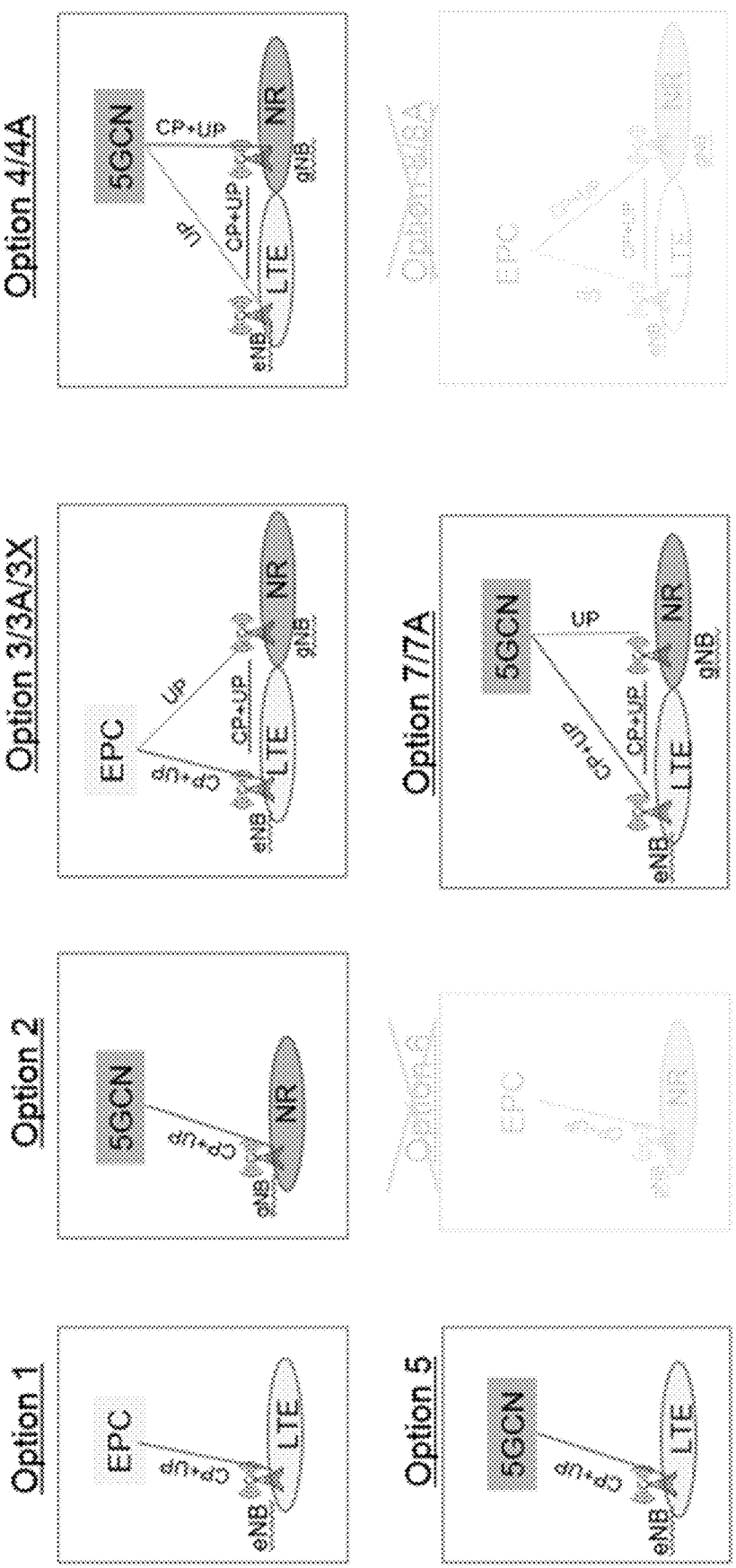
FIG. 1 is an illustration of LTE and NR interworking options according to some embodiments.
Figure 2:
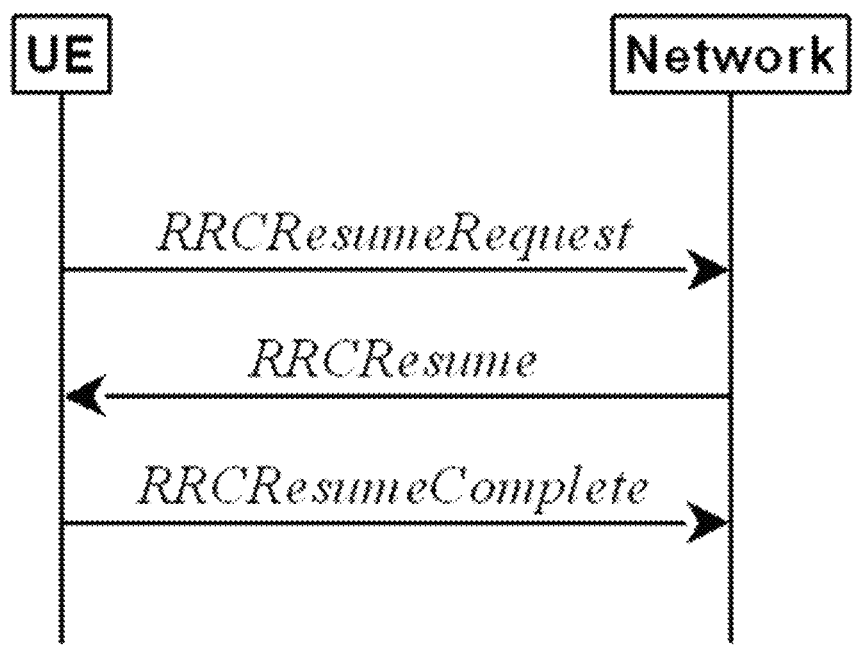
FIG. 2 is an illustration of a successful RRC connection resume according to some embodiments.
Figure 3:
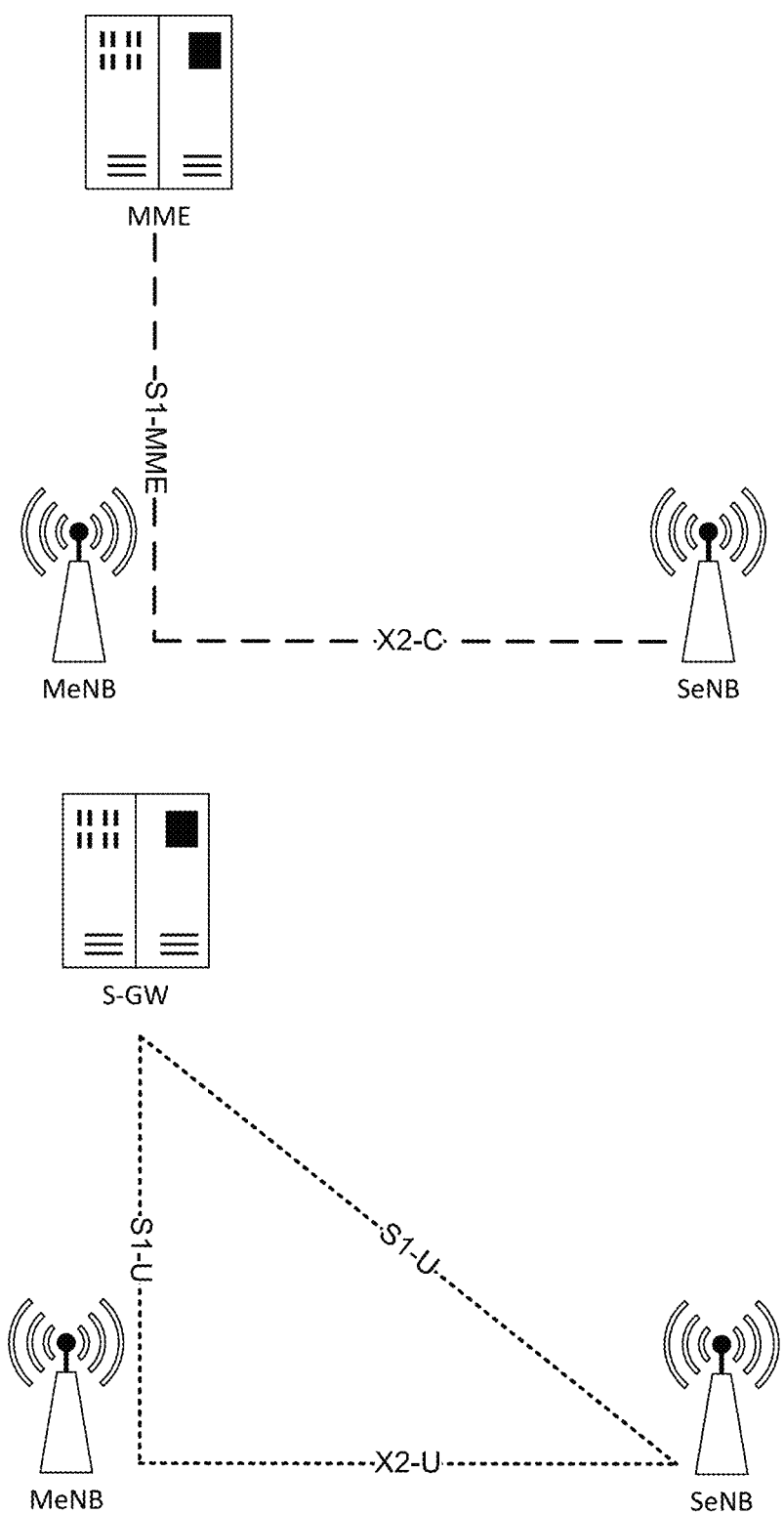
FIG. 3 is an illustration of C-Plane and U-Plane connectivity of eNBs involved in Dual Connectivity according to some embodiments.
Figure 4:
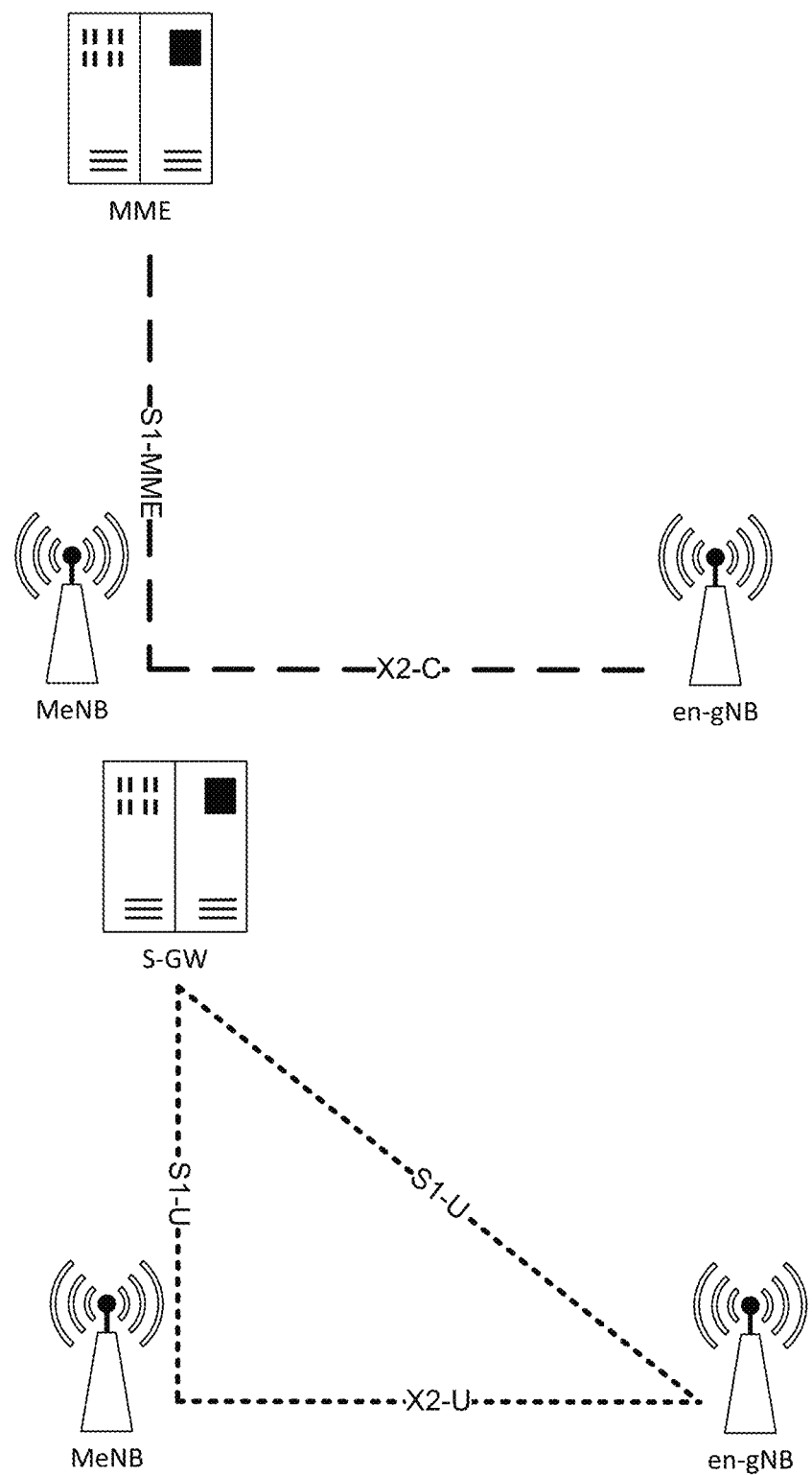
FIG. 4 is an illustration of C-Plane and U-Plane connectivity of MR-DC according to some embodiments.
Figure 5:
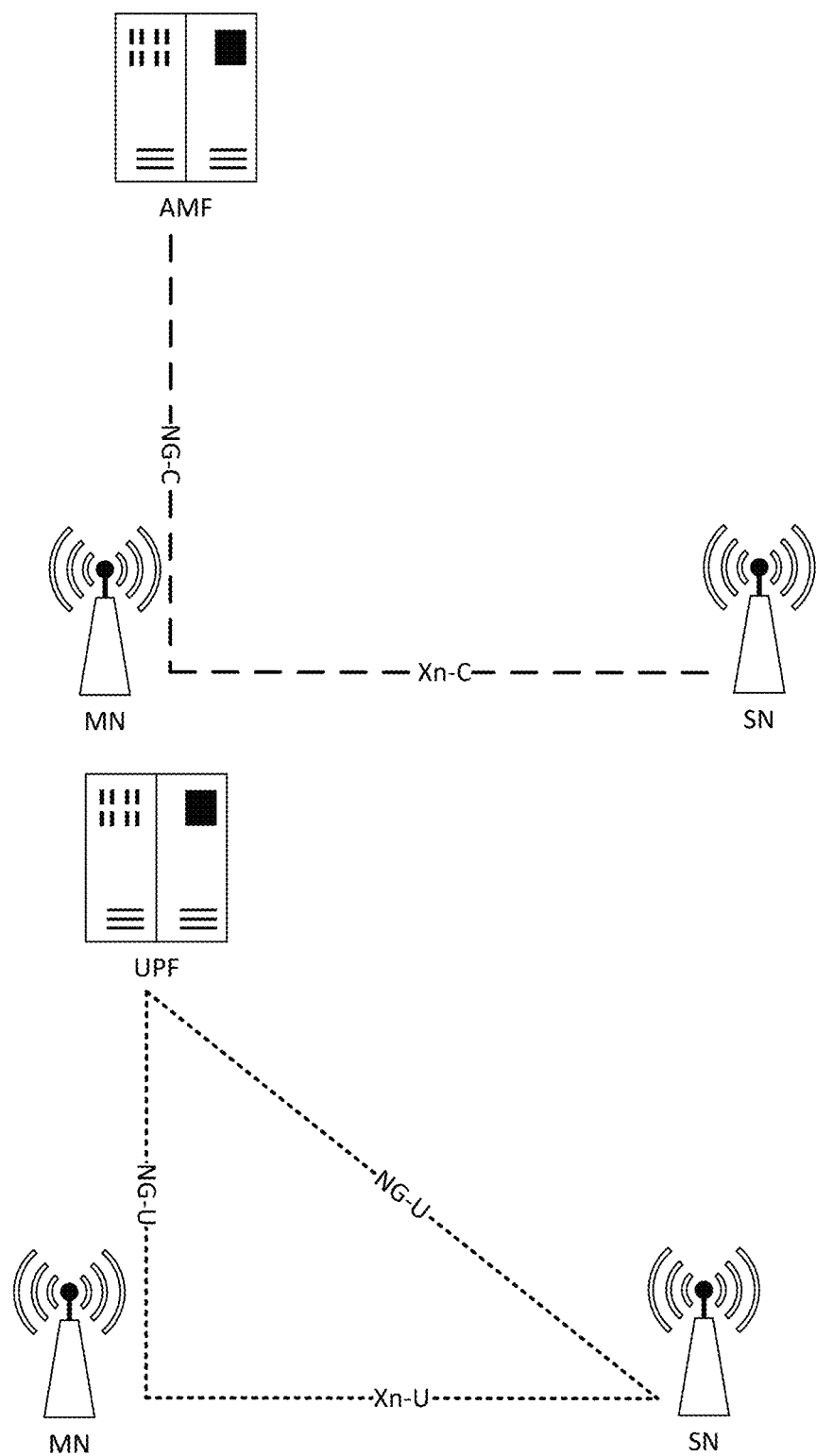
FIG. 5 is an illustration of C-Plane and U-Plane connectivity of EN-DC according to some embodiments.

FIG. 5 is a block diagram illustrating elements of a core network (CN) node 800 (e.g., an SMF node, an AMF node, etc.) of a communication network configured to provide cellular communication according to embodiments of inventive concepts. As shown, the CN node 800 may include network interface circuitry 807 (also referred to as a network interface) configured to provide communications with other nodes of the core network and/or the radio access network RAN. The CN node may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CN node may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to core network nodes).

There currently exist certain challenge(s). If a UE is suspended to RRC_INACTIVE when it is connected in MR-DC (for example, when connected to an gNB as MN and a gNB or ng-eNB as SN) when the UE requests to resume the connection, it may either perform delta configurations based on the stored configurations, or perform full configurations, by deleting all stored configurations before applying the new configurations received in the RRCResume message.

During handover the following different situation could arise, in e.g. EN-DC:
1. Target eNB understands the MCG part, target SN understands the SCG part
2. Target eNB understands the MCG part, target SN doesn't understand the SCG part
3. Target eNB doesn't understand the MCG part, target SN understands the SCG part
4. Target eNB doesn't understand the MCG part, target SN doesn't understand the SCG part In case 1, delta configuration can be applied for everything In case 2, it has been agreed that full configuration can be applied regarding the SCG part while performing only delta on the MCG part. This is achieved by releasing the SCG configurations and adding them with new configuration.

In cases 3 and 4 it has been agreed that a full configuration is applied for both MCG and SCG part, which means the whole previous configuration is released and new configurations are received and applied.

In RRC Resume we could have a similar situation as compared to the handover, where the new SN may not understand the old SCG configurations. In addition, some of the old SCG configurations may not be applicable since the UE may have moved while in RRC_INACTIVE and/or the network conditions may have changed during this time.

Currently RRC Resume only supports full or delta configurations which is applicable to both the MCG and SCG including the higher and lower layer configurations.

Certain aspects of the present disclosure and their embodiments may provide solutions to these or other challenges. In some embodiments that are described in detail herein, the RRC Resume and RRC Reconfiguration messages are enhanced to include indications to release the MCG and/or SCG lower layer configurations. This is applicable in both standalone and MR-DC scenarios. For example, in MR-DC scenarios, this enables a flexible way to resume or reconfigure (including handover) the UE such as:
1. Full configuration (on both the MCG and SCG lower layer and higher layer configurations)
2. Full configuration (on both the MCG and SCG lower layer) but keep or perform delta configuration on MCG/SCG higher layer configurations)
3. Full configuration on the SCG lower layer, while keeping or performing delta configuration on the MCG lower layer and MCG/SCG higher layer configurations
4. Full configuration on the MCG lower layer, while keeping or performing delta configuration on the SCG lower layer and MCG/SCG higher layer configurations.

There are, proposed herein, various embodiments which address one or more of the issues disclosed herein. Certain embodiments may provide one or more technical advantage including: enabling faster and more flexibility in performing reconfiguration and resumption of RRC connections in MR-DC and standalone scenarios.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

The techniques described herein describe standalone NR and/or MR-DC scenarios, but are also applicable to other RATs such as standalone E-UTRA connected to EPC and/or 5GC as well as DC scenarios in E-UTRA, e.g. LTE-DC. The following embodiments described below apply when a UE that was suspended to RRC_INACTIVE while it was operating in MR-DC resumes.

Figure 9:
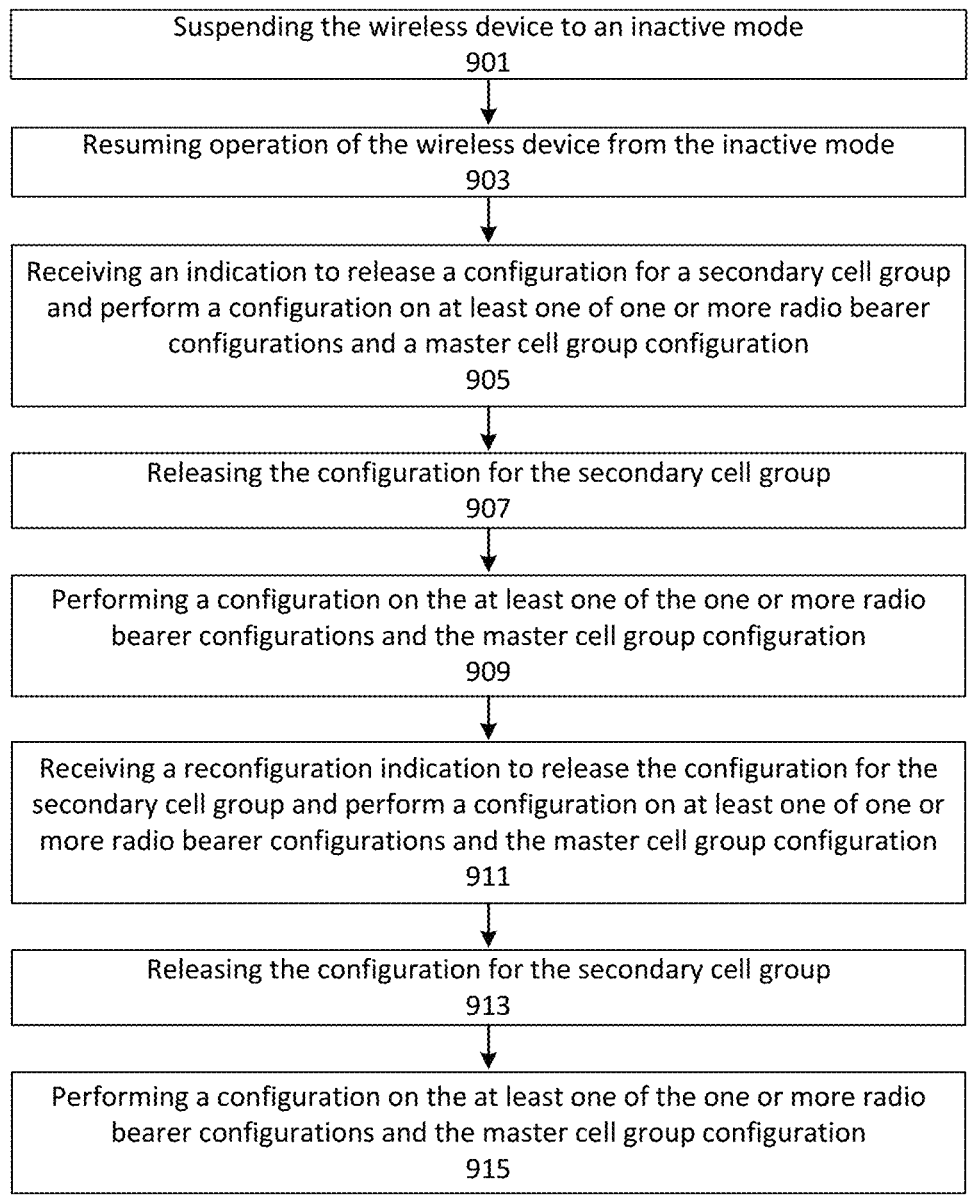
FIGS. 9-11 are flow charts illustrating operations of a wireless device according to some embodiments of inventive concepts.

Turning to FIG. 9, operations of the wireless device 600 (implemented using the structure of the block diagram of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective wireless device processing circuitry 603, processing circuitry 603 performs respective operations of the flow chart.

In block 901, the processing circuitry 603 may suspend the wireless device to an inactive mode. In block 903, the processing circuitry 603 may resume operation of the wireless device from the inactive mode. In block 905, the processing circuitry 603 may receive, via transceiver circuitry 601, an indication to release a configuration for a secondary cell group and perform a configuration on at least one of one or more radio bearer configurations and a master cell group configuration. For example, the wireless device 600 may receive an RRC Resume message that includes an indication that the UE shall release all configurations for the secondary cell group but perform a configuration on at least one of the higher layer (radioBearerConfig1 and radioBearerConfig2) and the master cell group configuration.

In block 907, responsive to receiving the indication, the processing circuitry 603 may release the configuration for the secondary cell group. In block 909, the processing circuitry 603 may perform a configuration on at least one of the one or more radio bearer configurations and the master cell group configuration. Thus, a full configuration or a delta configuration may be performed on the one or more radio bearers and/or the master cell group configuration.

In block 911, the processing circuitry 603 may receive, via transceiver circuitry 601, a reconfiguration indication to release the configuration for the secondary cell group and perform the configuration on the at least one of the one or more radio bearer configurations and the master cell group configuration.

Responsive to receiving the reconfiguration indication, the processing circuitry 603 may release the configuration for the secondary cell group in block 913 and perform the configuration on the at least one of the one or more radio bearer configurations and the master cell group configuration in block 915. The configuration may be a delta configuration or a new configuration. Thus, a full configuration or a delta configuration may be performed on the one or more radio bearers and/or the master cell group configuration.

The order in which the indication and reconfiguration indication are received may be in any order. For example, blocks 901-909 may be performed before blocks 911-915 are performed. In other embodiments, block 911-915 may be performed before blocks 901-909 are performed.

Various operations from the flow chart of FIG. 9 may be optional with respect to some embodiments of wireless devices and related methods. For example, when only the indication is received, blocks 911-915 may be optional. Similarly, when only a reconfiguration indication is received, blocks 901-909 may be optional.

Figure 10:
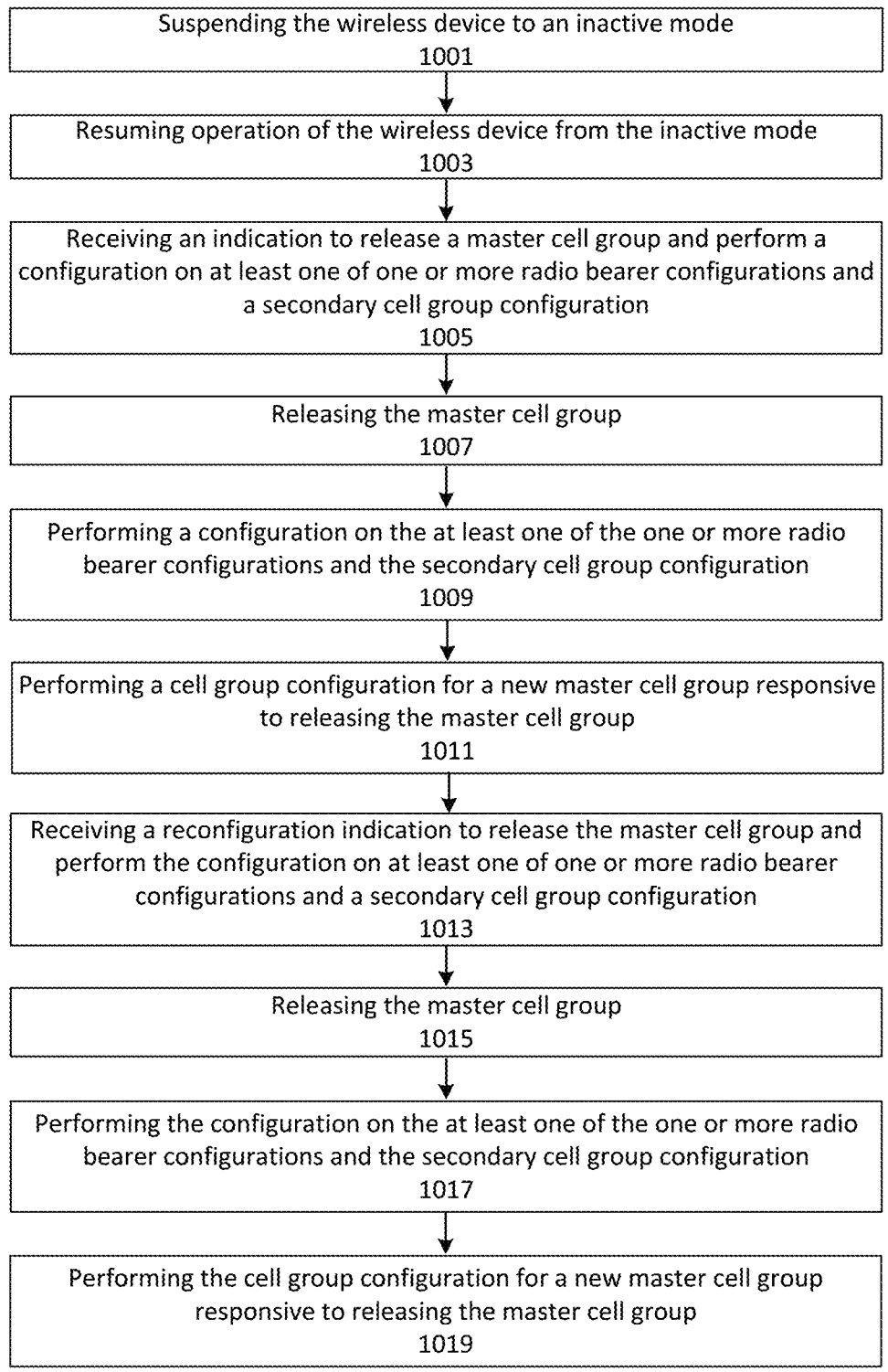

Turning to FIG. 10, operations of the wireless device 600 (implemented using the structure of the block diagram of FIG. 6) will now be discussed with reference to the flow chart of FIG. 10 according to some embodiments of inventive concepts. In the embodiments of FIG. 10, the wireless device receives an indication that the UE shall release all configurations for the master cell group but perform configuration on at least one of the higher layer (radioBearerConfig1 and radioBearerConfig2) and the secondary cell group configuration.

In blocks 1001 and 1003, the processing circuitry 603 may perform suspending the wireless device to an inactive mode and resuming operation of the wireless device from the inactive mode as described above with respect to FIG. 9.

In block 1005, the processing circuitry 603 may receive, via transceiver circuitry 601, an indication to release a master cell group and perform delta configuration on at least one of one or more radio bearer configurations and a secondary cell group configuration.

Responsive to receiving the indication to release the master cell group and perform the configuration on the at least one of the one or more radio bearer configurations and the secondary cell group configuration, the processing circuitry may release the master cell group in block 1007 and perform the configuration on the at least one of the one or more radio bearer configurations and the secondary cell group configuration in block 1009. Thus, a full configuration or a delta configuration may be performed on the one or more radio bearers and/or the secondary cell group configuration.

When a master cell group is released, a new master cell group should be configured for the wireless device to communicate in the network. Thus, in block 1011, the processing circuitry 603 may perform a cell group configuration for a new master cell group responsive to releasing the master cell group.

In block 1013, the processing circuitry 603 may receive a reconfiguration indication to release a master cell group and perform a configuration on the at least one of the one or more radio bearer configurations and the secondary cell group configuration.

Responsive to receiving the reconfiguration indication, the processing circuitry 603 may release the master cell group in block 1015 and perform the configuration on the at least one of one or more radio bearer configurations and the secondary cell group configuration in block 1017. Thus, a full configuration or a delta configuration may be performed on the one or more radio bearers and/or the secondary cell group configuration. In block 1019, the processing circuitry may perform a cell group configuration for a new master cell group responsive to releasing the master cell group.

The order in which the indication and reconfiguration indication are received may be in any order. For example, blocks 1001-1009 may be performed before blocks 1011-1017 are performed. In other embodiments, blocks 1011-1017 may be performed before blocks 1001-1009 are performed.

Various operations from the flow chart of FIG. 10 may be optional with respect to some embodiments of wireless devices and related methods. For example, when only the indication is received, blocks 1011-1017 may be optional. Similarly, when only a reconfiguration indication is received, blocks 1001-1009 may be optional.

Figure 11:
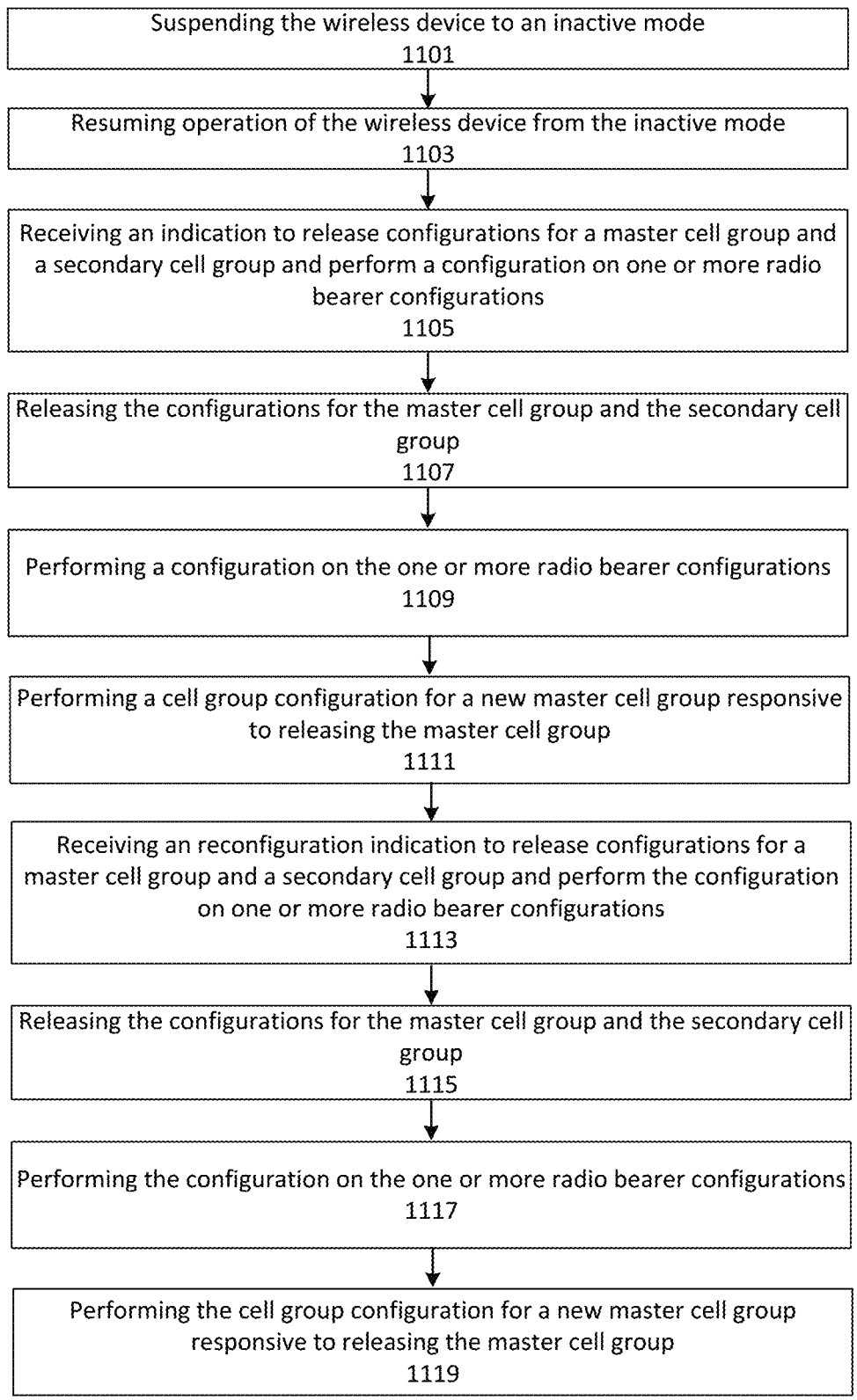

Turning to FIG. 11, operations of the wireless device 600 (implemented using the structure of the block diagram of FIG. 6) will now be discussed with reference to the flow chart of FIG. 11 according to some embodiments of inventive concepts. In the embodiments of FIG. 101 the wireless device may receive an indication that the wireless device shall release all configurations for the master cell group and the secondary cell group but perform delta configuration on the higher layer (radioBearerConfig1 and radioBearerConfig2).

In blocks 1101 and 1103, the processing circuitry 603 may perform suspending the wireless device to an inactive mode and resuming operation of the wireless device from the inactive mode as described above with respect to FIGS. 9 and 10.

In block 1105, the processing circuitry 603 may receive, via transceiver circuitry 601, an indication to release configurations for the master cell group and the secondary cell group and perform a configuration on the one or more radio bearer configurations.

Responsive to receiving the indication to release the configurations for the master cell group and the secondary cell group and perform a configuration on the one or more radio bearer configurations, the processing circuitry may release the master cell group and the secondary cell group in block 1107 and perform the configuration on the one or more radio bearer configurations in block 1109. Performing the configuration may be performing a full configuration or performing a delta configuration.

When a master cell group is released, a new master cell group should be configured for the wireless device to communicate in the network. Thus, in block 1111, the processing circuitry 603 may perform a cell group configuration for a new master cell group responsive to releasing the master cell group.

In block 1113, the processing circuitry 603 may receive, via the transceiver circuitry 601, a reconfiguration indication to release configurations for a master cell group and a secondary cell group and perform delta configuration on one or more radio bearer configurations.

Responsive to receiving the reconfiguration indication, the processing circuitry 603 may release the master cell group and the secondary cell group in block 1115 and perform delta configuration on the one or more radio bearer configurations in block 1117. In block 1119, the processing circuitry 603 may perform a cell group configuration for a new master cell group responsive to releasing the master cell group.

The order in which the indication and reconfiguration indication are received may be in any order. For example, blocks 1101-1109 may be performed before blocks 1111-1117 are performed. In other embodiments, blocks 1111-1117 may be performed before blocks 1101-1109 are performed.

Various operations from the flow chart of FIG. 11 may be optional with respect to some embodiments of wireless devices and related methods. For example, when only the indication is received, blocks 1111-1117 may be optional. Similarly, when only a reconfiguration indication is received, blocks 1101-1109 may be optional.

Furthermore, various blocks from the flow charts of FIGS. 9, 10, and 11 may be used with various blocks of any of FIGS. 9, 10, and 11. For example, blocks 901-909 may be used with blocks 911-915, 1013-1019, and/or 1113-1119, blocks 1001-1011 may be used with blocks 911-915, 1013-1019, and/or 1113-1119, and blocks 1101-1111 may be used with blocks 911-915, 1013-1019, and/or 1113-1119. The use of the blocks may be in any order. For example, blocks 901-909 may be before blocks 911-915, 1013-1019, and/or 1113-1119 or 911-915, 1013-1019, and/or 1113-1119 may be before blocks 901-909.

Figure 12:
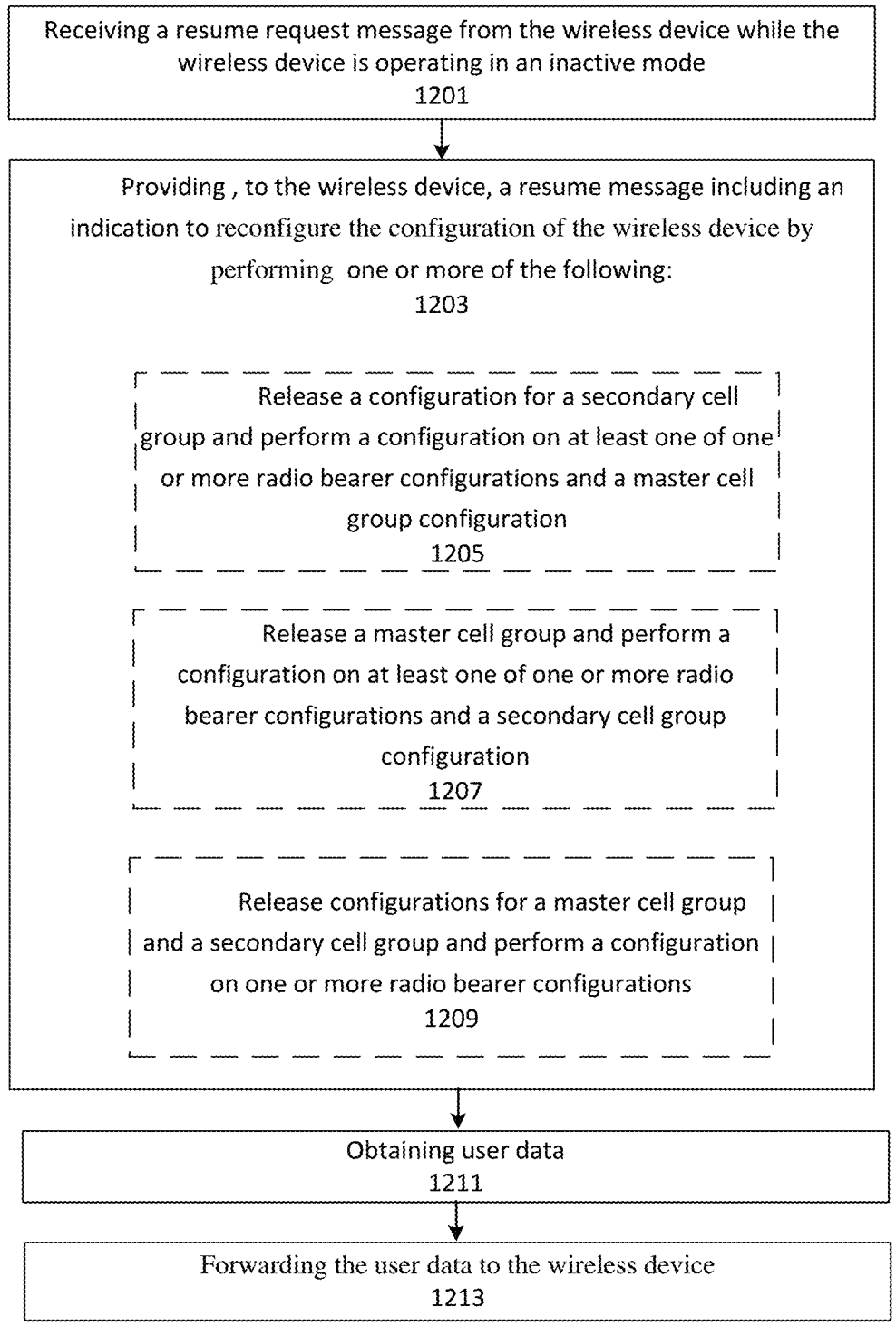
FIGS. 12-13 are flow charts illustrating operations of a network node (e.g., a base station) according to some embodiments of inventive concepts in accordance with some embodiments.

Turning now to FIG. 12, operations of the base station node 700 (implemented using the structure of the block diagram of FIG. 7) will now be discussed with reference to the flow chart of FIG. 12 according to some embodiments of inventive concepts. For example, modules may be stored in memory 705 of FIG. 7, and these modules may provide instructions so that when the instructions of a module are executed by respective node processing circuitry 703, processing circuitry 703 performs respective operations of the flow chart. In other embodiments, the node 800 may be used to perform some or all of the operations of the flow chart.

In block 1201, the processing circuitry 703 may receive a resume request from the wireless device while the wireless device is operating in an inactive mode.

In block 1203, the processing circuitry 703 may provide, to the wireless device via transceiver circuitry 701 and/or network interface circuitry 707, an indication to resume operation and to perform one or more of the following:

release (block 1205) a configuration for a secondary cell group and perform a configuration on at least one of one or more radio bearer configurations and a master cell group configuration;

release (block 1207) a master cell group and perform a configuration on at least one of one or more radio bearer configurations and a secondary cell group configuration; and/or release (block 1209) configurations for a master cell group and a secondary cell group and perform a configuration on one or more radio bearer configurations.

In block 1211, the processing circuitry 703 may obtain user data. In block 1213, the processing circuitry 703 may, via transceiver circuitry 701 and/or network interface circuitry 707, forward the user data to the wireless device.

Various operations from the flow chart of FIG. 12 may be optional with respect to some embodiments of base station nodes and related methods. For example, blocks 1211 and 1213 may be optional in some embodiments.

Figure 13:
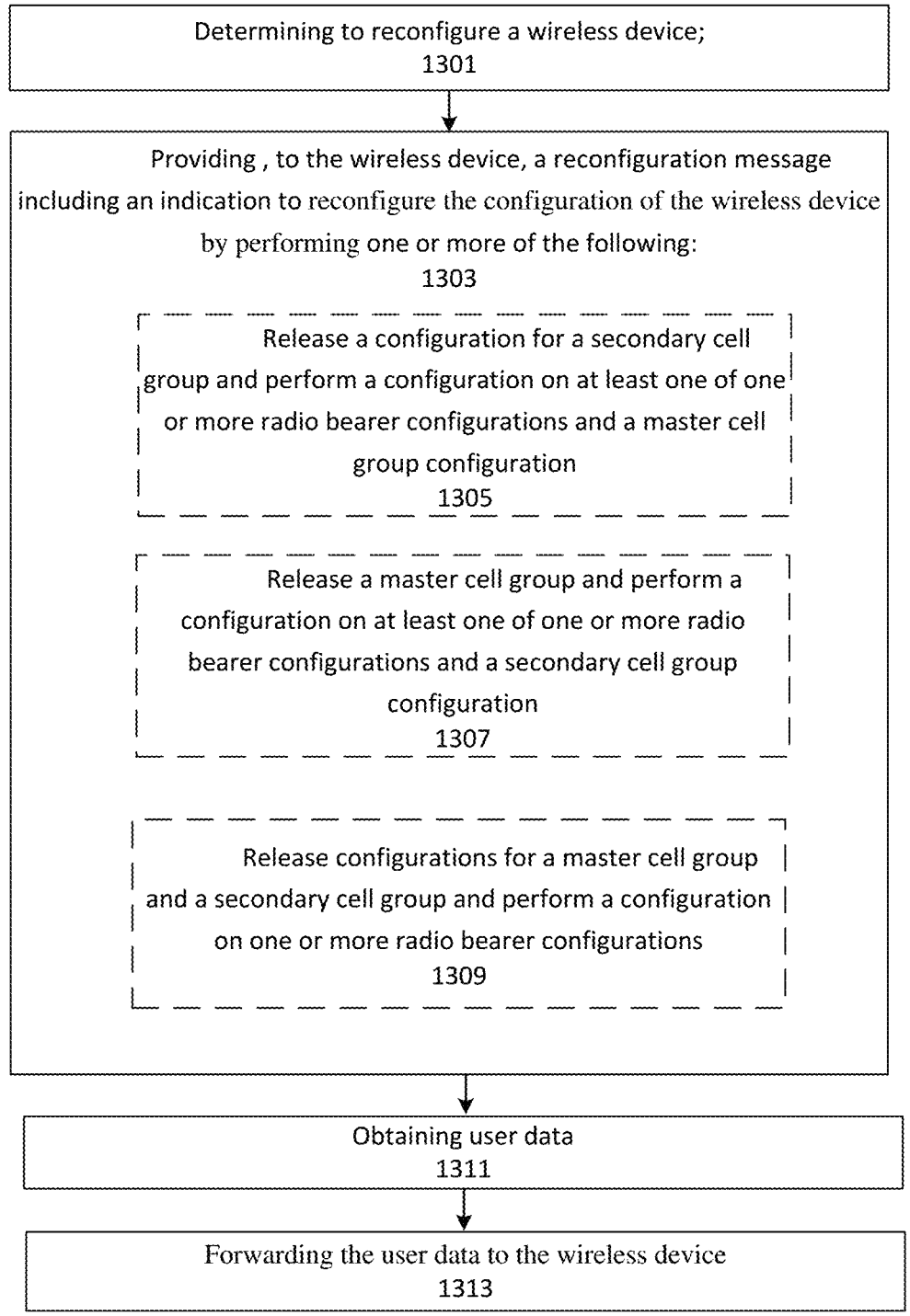

Turning now to FIG. 13, operations of the base station node 700 (implemented using the structure of the block diagram of FIG. 7) will now be discussed with reference to the flow chart of FIG. 13 according to some embodiments of inventive concepts. In other embodiments, the node 800 may be used to perform some or all of the operations of the flow chart.

In block 1301, the processing circuitry 703 may decide to reconfigure the wireless device. For example, the processing circuitry 703 may decide to initiate a handover of the wireless device and reconfigure the wireless device accordingly.

In block 1303, the processing circuitry 703 may provide, to the wireless device via transceiver circuitry 701 and/or network interface circuitry 707, a reconfigure message including an indication to reconfigure the configuration of the wireless device by performing one or more of the following:

release (1305) a configuration for a secondary cell group and perform a configuration on at least one of one or more radio bearer configurations and a master cell group configuration;

release (1307) a master cell group and perform delta configuration on at least one of one or more radio bearer configurations and a secondary cell group configuration; and/or release (1309) configurations for a master cell group and a secondary cell group and perform a configuration on one or more radio bearer configurations.

In block 1311, the processing circuitry 703 may obtain user data. In block 1313, the processing circuitry 703 may, via transceiver circuitry 701 and/or network interface circuitry 707, forward the user data to the wireless device.

Example Realization for Release of SCG

Changes to TS 38.331 (double underlines indicate added)

5.1.1.1 RRCResume message

```
-- ASN1START
-- TAG-RRCRESUME-START
RRCResume ::=                    SEQUENCE {
    rrc-TransactionIdentifier    ,
    criticalExtensions           Choice {
```

```
    rrcResume                         RRCResume-IEs,
        criticalExtensionsFuture      SEQUENCE { }
    }
}
RRCResume-IEs ::=                     SEQUENCE {
    radioBearerConfig
OPTIONAL, -- Need M
    masterCellGroup                   OCTET STRING (CONTAINING CellGroupConfig)
OPTIONAL, -- Need M
    measConfig
OPTIONAL, -- Need M
    fullConfig                        ENUMERATED {true}
OPTIONAL, -- Need N
    lateNonCriticalExtension          OCTET STRING
OPTIONAL,
    nonCriticalExtension              RRCResume-v15xx-IEs SEQUENCE{ }
OPTIONAL
}
RRCResume-v15xx-IEs ::=               SEQUENCE {
    radioBearerConfig2-r15x           OCTET STRING (CONTAINING RadioBearerConfig)
OPTIONAL, -- Need M
    sk-Counter-r15x                   INTEGER (0..65535)
OPTIONAL, -- Need N
    mrdc-Release-r15x                 ENUMERATED {true}
OPTIONAL, -- Need N
    secondaryCellGroup-r15x           OCTET STRING (CONTAINING CellGroupConfig)
OPTIONAL, -- Need M
    measConfig2-r15x                  OCTET STRING (CONTAINING MeasConfig)
OPTIONAL, -- Need M
    eutra-SecondaryCellGroup-r15x
        OCTET STRING (CONTAINING RRCConnectionReconfiguration)
OPTIONAL, -- Need M
    nonCriticalExtension              SEQUENCE{ }
OPTIONAL
}
-- TAG-RRCRESUME-STOP
-- ASN1STOP
```

| RRCResume-IEs field descriptions |
|---|
| masterCellGroup |
| Configuration of the master cell group (NR Standalone or MR-DC): |
| measConfig |
| Configuration of measurements. |
| measConfig2 |
| Configuration of a secondary set of measurements (NR-DC). |
| mrdc-Release |
| A one-shot field indicating whether the UE releases the stored SCG related configuration (e.g. secondaryCellGroup, eutra-SecondaryCellGroup, SRB3 and SCG measConfig). New SCG configurations can then be configured. |
| radioBearerConfig, radioBearerConfig2 |
| Configuration of Radio Bearers (DRBs, SRBs) including SDAP/PDCP. |
| secondaryCellGroup |
| Configuration of NR secondary cell group. |
| eutra-SecondaryCellGroup |
| Includes the LTE RRCConnectionReconfiguration message as specified in TS 36.331 [10]. In this version of the specification, the LTE RRC message only includes fields radioResourceConfigDedicated (with no PDCP configuration present) and/or mobilityControlInfo and/or measConfig. If eutra-secondaryCellGroup is configured, the network always includes this field upon MN handover to initiate an LTE SCG reconfiguration with sync and key change. |
| sk-Counter |
| A one-shot counter used upon refresh of S-$K_{gNB}$ or S-$K_{eNB}$ based on the newly derived KgNB during RRCResume. The field is mandatory present in case of resumption or configuration of MR-DC during RRC resume. Otherwise, the field is absent. |

5.3.13.4 Reception of the RRCResume by the UE

The UE shall:

1> stop timer T319;
1> if the RRCResume includes the fullConfig:
   2> perform the full configuration procedure as specified in 5.3.5.11;
1> else:
   2> restore the PDCP state and reset COUNT value for SRB2 and all DRBs;
   2> restore the cellGroupConfig from the stored UE AS context;
   2> indicate to lower layers that stored UE AS context is used;
1> discard the fullI-RNTI, shortI-RNTI and the stored UE AS context, except ran-NotificationAreaInfo;
1> if the RRCResume includes the masterCellGroup:
   2> perform the cell group configuration for the received masterCellGroup according to 5.3.5.5;
1> if the RRCResume includes the radioBearerConfig:
   2> perform the radio bearer configuration according to 5.3.5.6;
1> if the RRCResume message includes the sk-Counter:
   2> perform security key update procedure as specified in 5.3.5.7;
1> if the RRCResume message includes the radioBearerConfig2:
   2> perform the radio bearer configuration according to 5.3.5.6;

1> if theRRCResume message includes the mrdc-Release:
   2> release the MR-DC configurations as specified in section 5.3.5.10a;

Editor's note: The procedures for MR-DC release are FFS.

1> if the RRCResume message includes the secondaryCellGroup:
   2> perform the cell group configuration for the SCG according to 5.3.5.5;

1> if the RRCResume message includes the measConfig2:
   2> perform the measurement configuration procedure as specified in 5.5.2;

1> if the RRCResume message includes the eutra-secondaryCellGroup:
   2> perform the cell group configuration for the SCG according to TS 36.331 [10], section 5.3.5.4;

1> resume SRB2 and all DRBs;

1> if stored, discard the cell reselection priority information provided by the cellReselectionPriorities or inherited from another RAT;

1> stop timer T320, if running;

1> if the RRCResume message includes the measConfig:
   2> perform the measurement configuration procedure as specified in 5.5.2;

1> resume measurements if suspended;

Editor's Note: FFS Whether there is a need to define UE actions related to access control timers (equivalent to T302, T303, T305, T306, T308 in LTE). For example, informing upper layers if a given timer is not running.

1> enter RRC_CONNECTED;

1> indicate to upper layers that the suspended RRC connection has been resumed;

1> stop the cell re-selection procedure;

1> consider the current cell to be the PCell;

1> set the content of the of RRCResumeComplete message as follows:
   2> if the upper layer provides NAS PDU, set the dedicatedNAS-Message to include the information received from upper layers;
   2> if the upper layer provides a PLMN, set the selectedPLMN-Identity to PLMN selected by upper layers (TS 24.501 [23]) from the PLMN(s) included in the plmn-IdentityList in SIB1;
   2> if the masterCellGroup contains the reportUplinkTxDirectCurrent:
     3> include the uplinkTxDirectCurrentList;

1> submit the RRCResumeComplete message to lower layers for transmission;

1> the procedure ends.

5.3.5.4 Secondary Cell Group Release

The UE shall:

1> as a result of SCG release triggered by E-UTRA or NR:
   2> reset SCG MAC, if configured;
   2> for each RLC bearer that is part of the SCG configuration:
     3> perform RLC bearer release procedure as specified in 5.3.5.5.3;
   2> release the SCG configuration;
   2> stop timer T310 for the corresponding SpCell, if running;
   2> stop timer T304 for the corresponding SpCell, if running.

NOTE: Release of cell group means only release of the lower layer configuration of the cell group but the RadioBearerConfig may not be released.

5.3.5.10a MR-DC Release

The UE shall:

1> release SRB3 (configured according to radioBearerConfig), if present;

1> if the UE is configured with NR SCG:
   2> release the SCG configuration as specified in section 5.3.5.4;
   2> release measConfig2;

1> else (the UE is configured with E-UTRA SCG):
   2> release the SCG configuration as specified in TS 36.331 [10], section 5.3.10.x to release the E-UTRA SCG;

Editor's note: It is FFS how the E-UTRA SCG is released in 36.331.

Changes to TS 36.331

5.3.10.x SCG Release

The UE shall:

1> as a result of SCG release triggered by NR:
   2> release the SCG configuration;
   2> stop timer T313 for the corresponding PSCell, if running;
   2> stop timer T307 for the corresponding PSCell, if running.

NOTE: The SCG configuration includes all configurations in the RRCConnectionReconfiguration message received from the NR MN.

Example Realization for Release of MCG

A similar indication could be introduced to only release the lower layer of the MCG part, applicable both in MR-DC and in single connectivity. In the example below we add the new indicator (i.e. mcg-Release) on top of the mrdc-Release indication, but it is also possible to only include the mcg-Release indication without the SCG configurations or release indication.

This indication could also be introduced in RRCReconfiguration message i.e. to use it for handovers where the higher layer configurations can be reused but not the lower layers.

For instance in a CU-DU split (central unit-distributed unit), where the target CU implements a standard which is the same as the source CU, but the target DU is running an older version of the standard.

Another example, if the UE performs a handover between two DU connected to the same CU, the old lower layer configurations are not applicable and need to be replaced, but the higher layer configurations remain in the same CU. Instead of configuring delta for all parameters, the UE could apply full configurations only on the lower layer configurations while keeping the higher layer configurations.

This could also apply for handover cases in MR-DC, where the lower layer configurations could have MCG and SCG parts but the higher layer configurations remain in the same CU. Thus the lower layer applies full configurations, while the higher layers remain the same or applies delta configurations.

5.2.1 Changes to TS 38.331

| RRCResume message |
|---|
| -- ASN1START<br>-- TAG-RRCRESUME-START<br>RRCResume ::=                              SEQUENCE {<br>   rrc-TransactionIdentifier             RRC-TransactionIdentifier,<br>   criticalExtensions                    CHOICE {<br>      rrcResume                           RRCResume-IEs,<br>      criticalExtensionsFuture            SEQUENCE { }<br>   }<br>}<br>RRCResume-IEs ::=                         SEQUENCE {<br>   radioBearerConfig                     RadioBearerConfig<br>OPTIONAL, -- Need M<br>   masterCellGroup                       OCTET STRING (CONTAINING CellGroupConfig)<br>OPTIONAL, -- Need M<br>   measConfig                            MeasConfig<br>OPTIONAL, -- Need M<br>   fullConfig                            ENUMERATED {true}<br>OPTIONAL, -- Need N<br>   lateNonCriticalExtension              OCTET STRING<br>OPTIONAL,<br>   nonCriticalExtension                  RRCResume-v15xx-IEs<br>OPTIONAL<br>}<br>RRCResume-v15xx-IEs ::=                   SEQUENCE {<br>   radioBearerConfig2-r15x               OCTET STRING (CONTAINING RadioBearerConfig)<br>OPTIONAL, -- Need M<br>   sk-Counter-r15x                       INTEGER (0..65535)<br>OPTIONAL, -- Need N<br>OPTIONAL, -- Need N   mcg-Release-r15x<br>OPTIONAL, -- Need N<br>   mrdc-Release-r15x                     ENUMERATED {true}<br>OPTIONAL, -- Need N<br>   secondaryCellGroup-r15x               OCTET STRING (CONTAINING CellGroupConfig)<br>OPTIONAL, -- Need M<br>   measConfig2-r15x                      OCTET STRING (CONTAINING MeasConfig)<br>OPTIONAL, -- Need M<br>   eutra-SecondaryCellGroup-r15x<br>   OCTET STRING (CONTAINING RRCConnectionReconfiguration)<br>OPTIONAL, -- Need M<br>   nonCriticalExtension                  SEQUENCE { }<br>OPTIONAL<br>}<br>-- TAG-RRCRESUME-STOP<br>-- ASN1STOP |

EMBODIMENTS

Group A Embodiments

1. A method performed by a wireless device for performing reconfiguration and/or resumption of a radio resource control, RRC, connections while operating in a Multi-RAT Dual Connectivity, MR-DC or standalone New Radio, NR, environment, the method comprising:
suspending the wireless device to an inactive mode;
resuming operation of the wireless device from the inactive mode, the resuming including receiving an indication to (1) release a configuration for a secondary cell group and (2) perform a delta configuration on one or more radio bearer configurations and on a master cell group configuration.

2. A method performed by a wireless device for performing reconfiguration and/or resumption of a radio resource control, RRC, connections while operating in a Multi-RAT Dual Connectivity, MR-DC environment, the method comprising:
suspending the wireless device to an inactive mode;
resuming operation of the wireless device from the inactive mode, the resuming including receiving an indication to (1) release a master cell group and (2) perform delta configuration on one or more radio bearer configurations and on a secondary cell group configuration.

3. A method performed by a wireless device for performing reconfiguration and/or resumption of a radio resource control, RRC, connections while operating in a Multi-RAT Dual Connectivity, MR-DC environment, the method comprising:
suspending the wireless device to an inactive mode;
resuming operation of the wireless device from the inactive mode, the resuming including receiving an indication to (1) release configurations for a master cell group and a secondary cell group and (2) perform delta configuration on one or more radio bearer configurations.

Group B Embodiments

4. A method performed by a base station for performing reconfiguration and/or resumption of a connection, the method comprising:
providing, to a user equipment operating in an inactive mode, a resume message including an indication to perform one or more of the following:

release a configuration for a secondary cell group and perform a delta configuration on one or more radio bearer configurations and on a master cell group configuration;

release a master cell group and perform delta configuration on one or more radio bearer configurations and on a secondary cell group configuration; or release a master cell group and perform delta configuration on one or more radio bearer configurations and on a secondary cell group configuration.

5. The method of claim 4 wherein the method is performed in a Multi-RAT Dual Connectivity, MR-DC, and/or standalone New Radio, NR, environment, and wherein the connection includes a radio resource control, RRC, connection.

6. The method of any of the previous embodiments, further comprising:
   obtaining user data; and
   forwarding the user data to a host computer or a wireless device.

Group C Embodiments

7. A wireless device for providing reconfiguration and/or resumption of a connection, the wireless device comprising:
   processing circuitry configured to perform any of the steps of any of the Group A embodiments; and
   power supply circuitry configured to supply power to the wireless device.

8. A base station for providing reconfiguration and/or resumption of a connection, the base station comprising:
   processing circuitry configured to perform any of the steps of any of the Group B embodiments;
   power supply circuitry configured to supply power to the wireless device.

9. A user equipment (UE) for providing reconfiguration and/or resumption of a connection, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

10. A communication system including a host computer comprising:
    processing circuitry configured to provide user data; and
    a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

11. The communication system of the previous embodiment further including the base station.

12. The communication system of the previous 2 embodiments, further including the UE, wherein the UE is configured to communicate with the base station.

13. The communication system of the previous 3 embodiments, wherein:
    the processing circuitry of the host computer is configured to execute a host application, thereby providing the user data; and
    the UE comprises processing circuitry configured to execute a client application associated with the host application.

14. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.

15. The method of the previous embodiment, further comprising, at the base station, transmitting the user data.

16. The method of the previous 2 embodiments, wherein the user data is provided at the host computer by executing a host application, the method further comprising, at the UE, executing a client application associated with the host application.

17. A user equipment (UE) configured to communicate with a base station, the UE comprising a radio interface and processing circuitry configured to performs the of the previous 3 embodiments.

18. A communication system including a host computer comprising:
    processing circuitry configured to provide user data; and
    a communication interface configured to forward user data to a cellular network for transmission to a user equipment (UE), wherein the UE comprises a radio interface and processing circuitry, the UE's components configured to perform any of the steps of any of the Group A embodiments.

19. The communication system of the previous embodiment, wherein the cellular network further includes a base station configured to communicate with the UE.

20. The communication system of the previous 2 embodiments, wherein:
    the processing circuitry of the host computer is configured to execute a host application, thereby providing the user data; and
    the UE's processing circuitry is configured to execute a client application associated with the host application.

21. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.

22. The method of the previous embodiment, further comprising at the UE, receiving the user data from the base station.

23. A communication system including a host computer comprising:
communication interface configured to receive user data originating from a transmission from a user equipment (UE) to a base station, wherein the UE comprises a radio interface and processing circuitry, the UE's processing circuitry configured to perform any of the steps of any of the Group A embodiments.

24. The communication system of the previous embodiment, further including the UE.

25. The communication system of the previous 2 embodiments, further including the base station, wherein the base station comprises a radio interface configured to communicate with the UE and a communication interface configured to forward to the host computer the user data carried by a transmission from the UE to the base station.

26. The communication system of the previous 3 embodiments, wherein:
the processing circuitry of the host computer is configured to execute a host application; and
the UE's processing circuitry is configured to execute a client application associated with the host application, thereby providing the user data.

27. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

28. A method implemented in a communication system including a host computer, a base station and a user equipment (UE), the method comprising:
at the host computer, receiving user data transmitted to the base station from the UE, wherein the UE performs any of the steps of any of the Group A embodiments.

29. The method of the previous embodiment, further comprising, at the UE, providing the user data to the base station.

30. The method of the previous 2 embodiments, further comprising:
at the UE, executing a client application, thereby providing the user data to be transmitted; and
at the host computer, executing a host application associated with the client application.

31. The method of the previous 3 embodiments, further comprising:
at the UE, executing a client application; and
at the UE, receiving input data to the client application, the input data being provided at the host computer by executing a host application associated with the client application, wherein the user data to be transmitted is provided by the client application in response to the input data.

32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

33. The communication system of the previous embodiment further including the base station.

34. The communication system of the previous 2 embodiments, further including the UE, wherein the UE is configured to communicate with the base station.

35. The communication system of the previous 3 embodiments, wherein:
the processing circuitry of the host computer is configured to execute a host application;
the UE is configured to execute a client application associated with the host application, thereby providing the user data to be received by the host computer.

36. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

37. The method of the previous embodiment, further comprising at the base station, receiving the user data from the UE.

38. The method of the previous 2 embodiments, further comprising at the base station, initiating a transmission of the received user data to the host computer.

ADDITIONAL EXPLANATION

Figure 14:
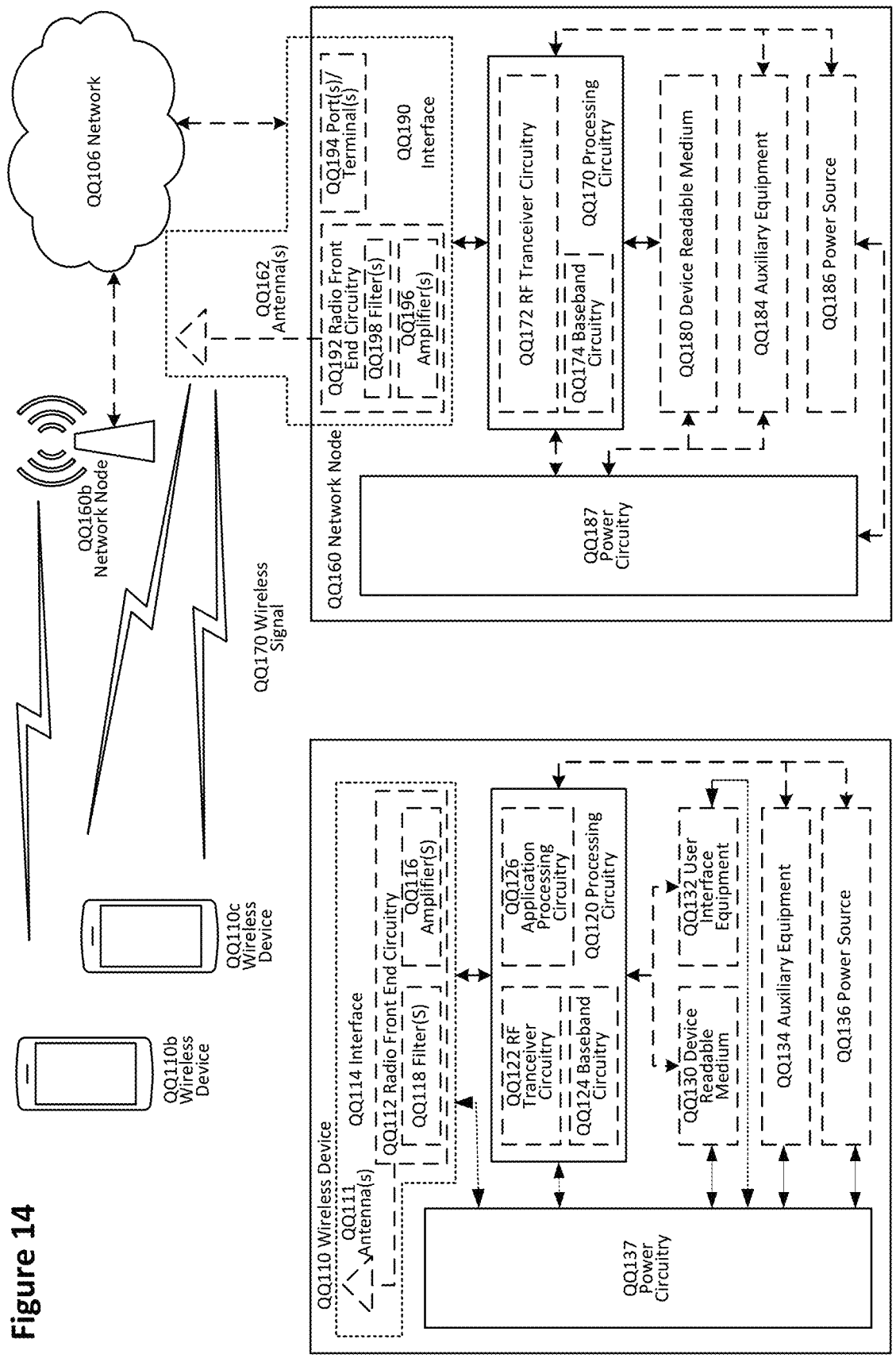
FIG. 14 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
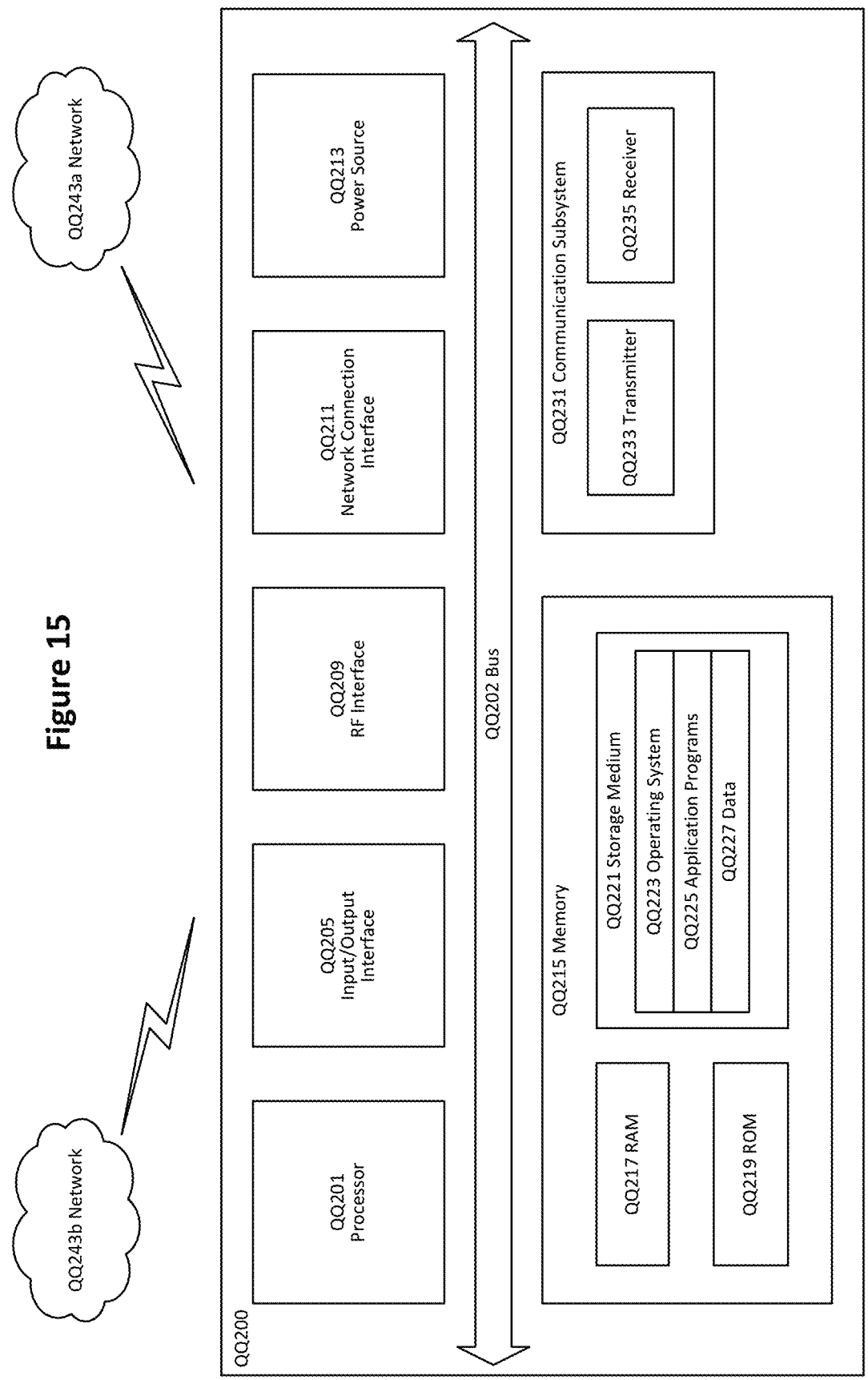
FIG. 15 is a block diagram of a user equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
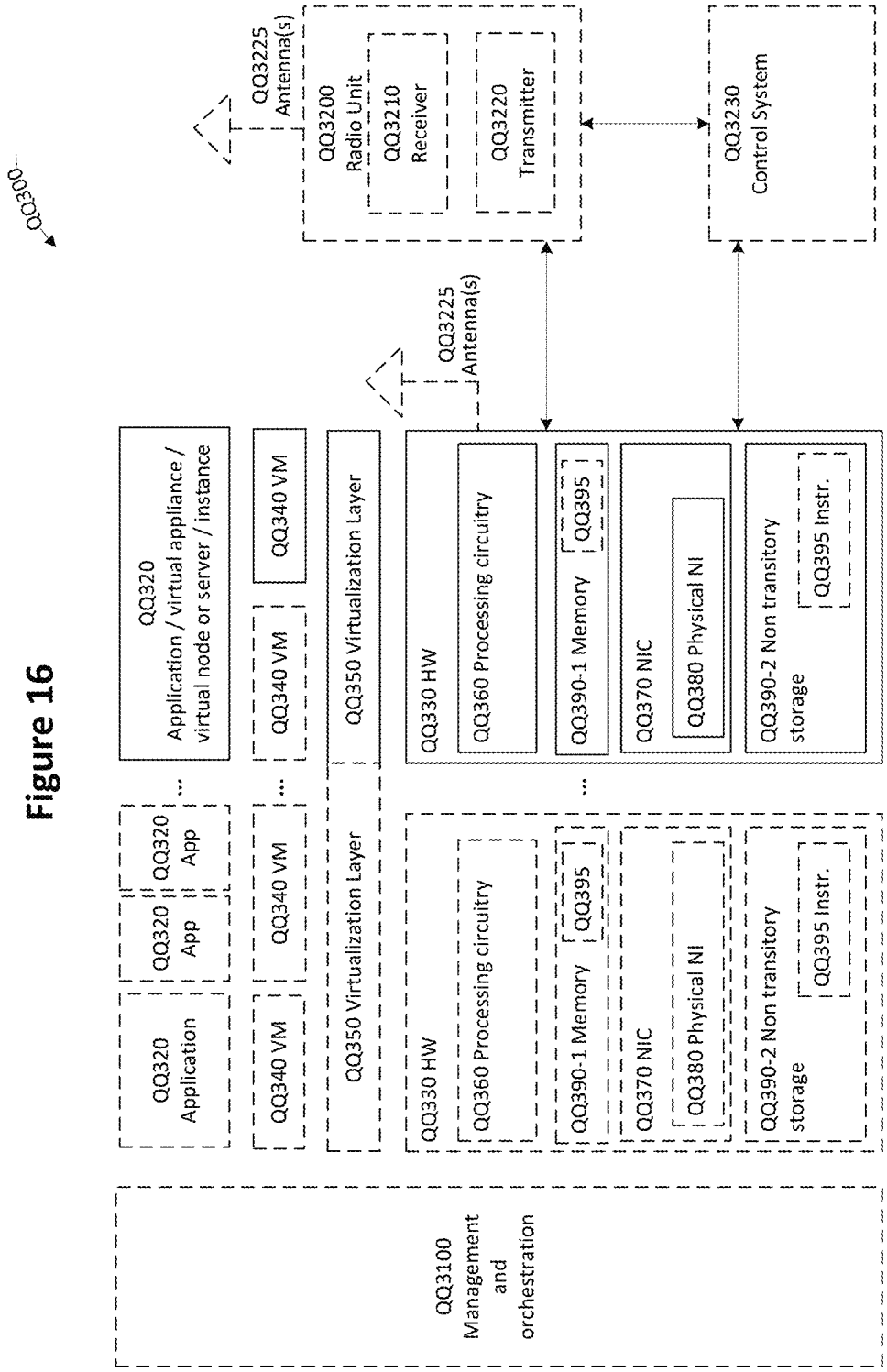
FIG. 16 is a block diagram of a virtualization environment in accordance with some embodiments.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be affected with the use of control system QQ3230 which may alternatively be used for communication between the hardware nodes QQ330 and radio units QQ3200.

Figure 17:
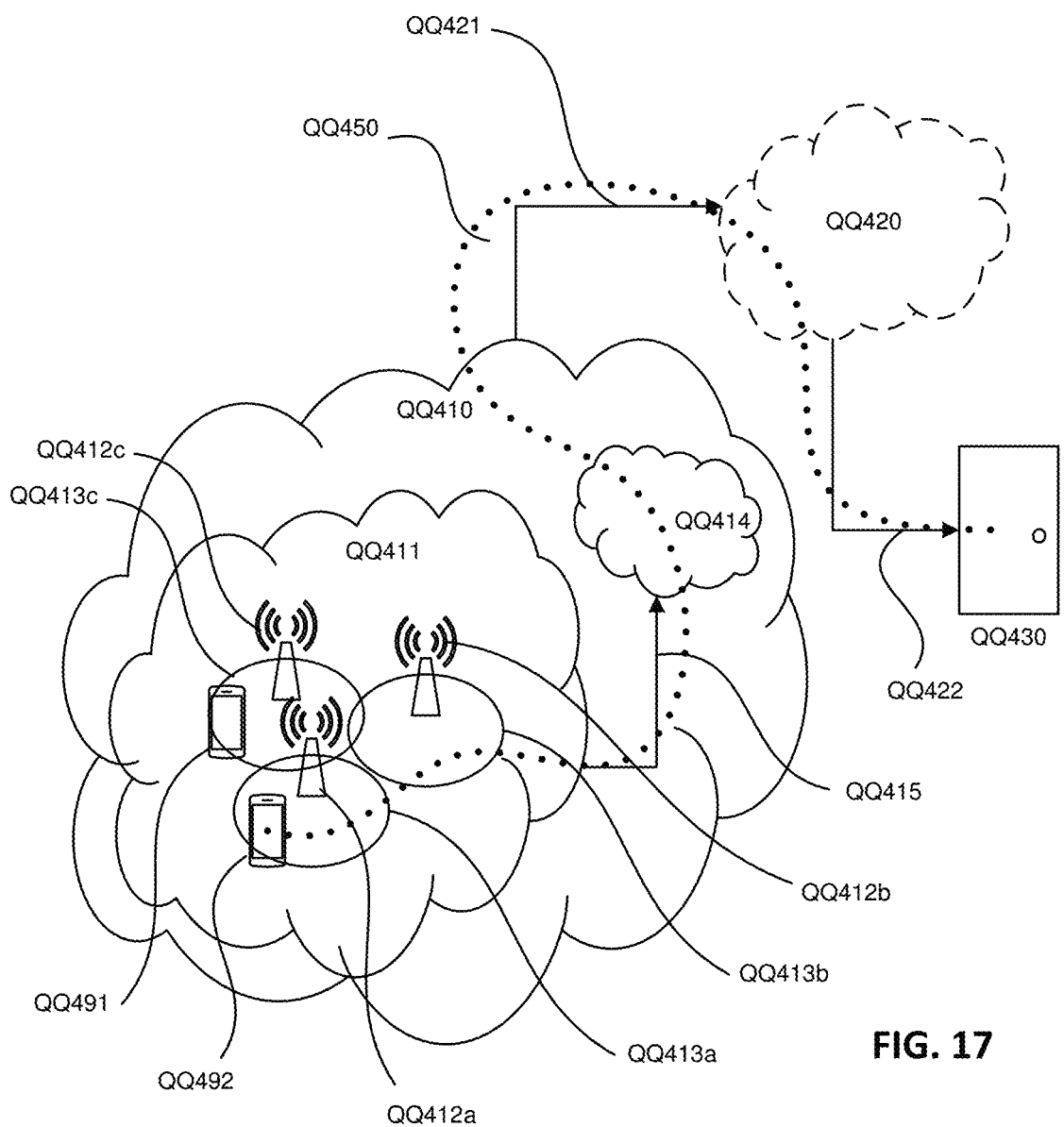
FIG. 17 is a block diagram of a telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 18:
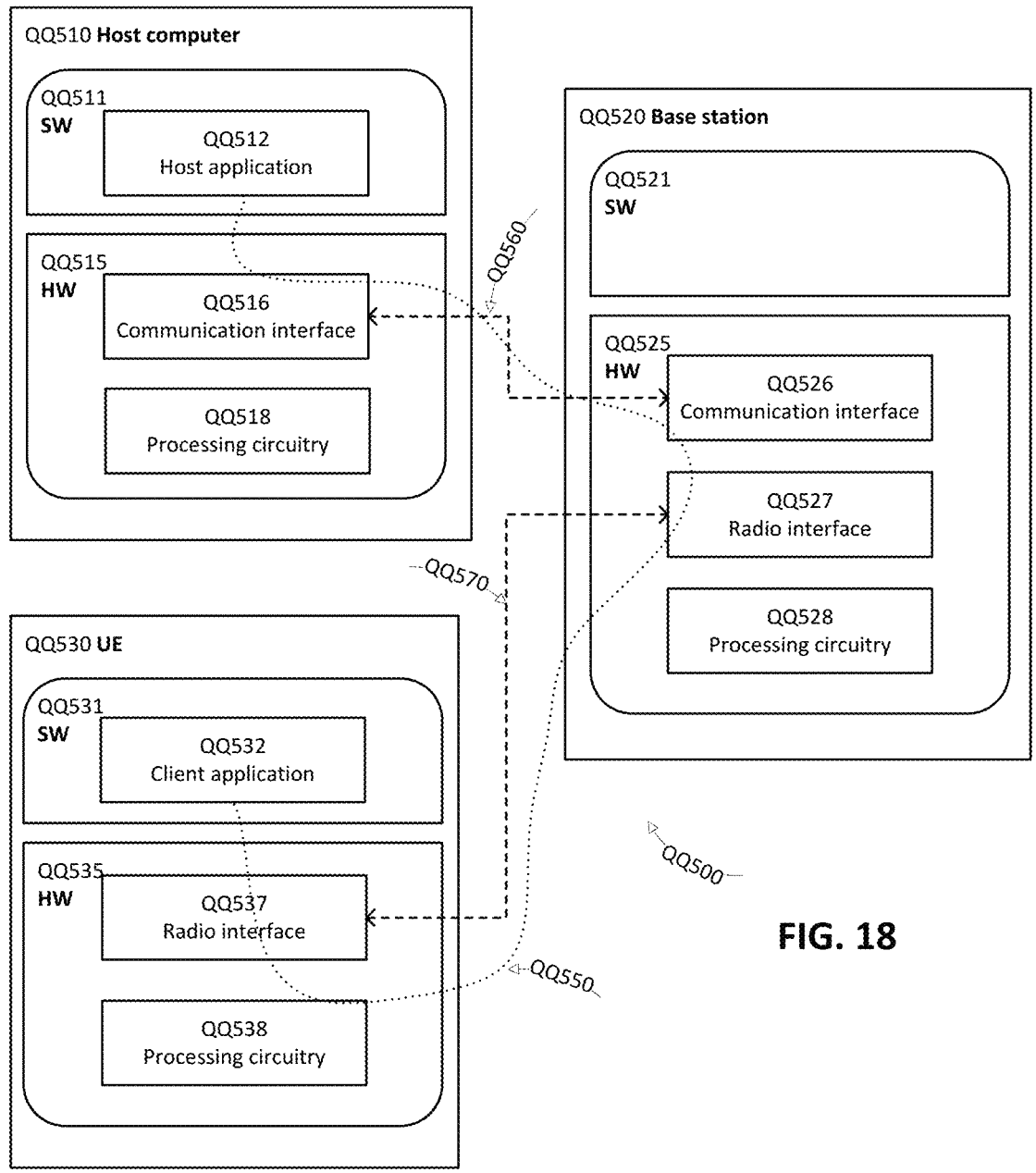
FIG. 18 is a block diagram of a host computer communicating via a base station with a user equipment over a partially wireless connection in accordance with some embodiments.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
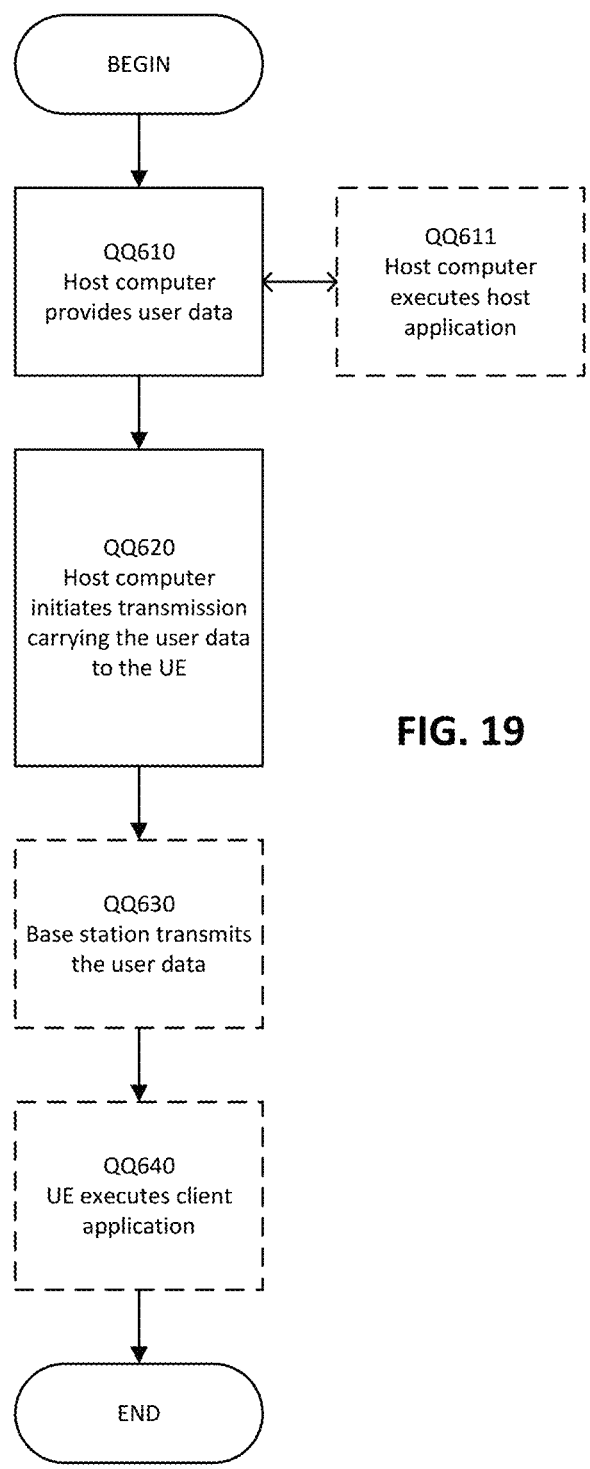
FIG. 19 is a block diagram of methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
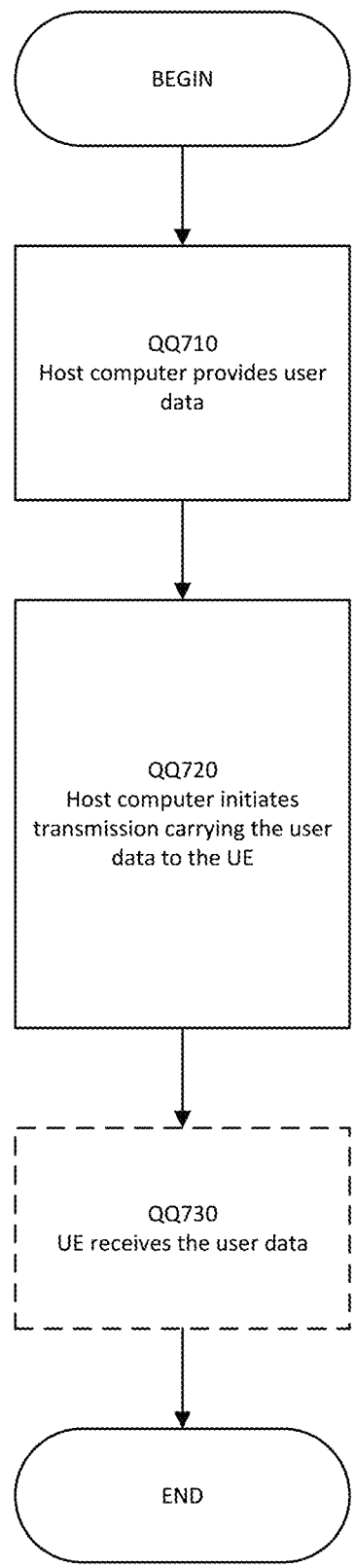
FIG. 20 is a block diagram of methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
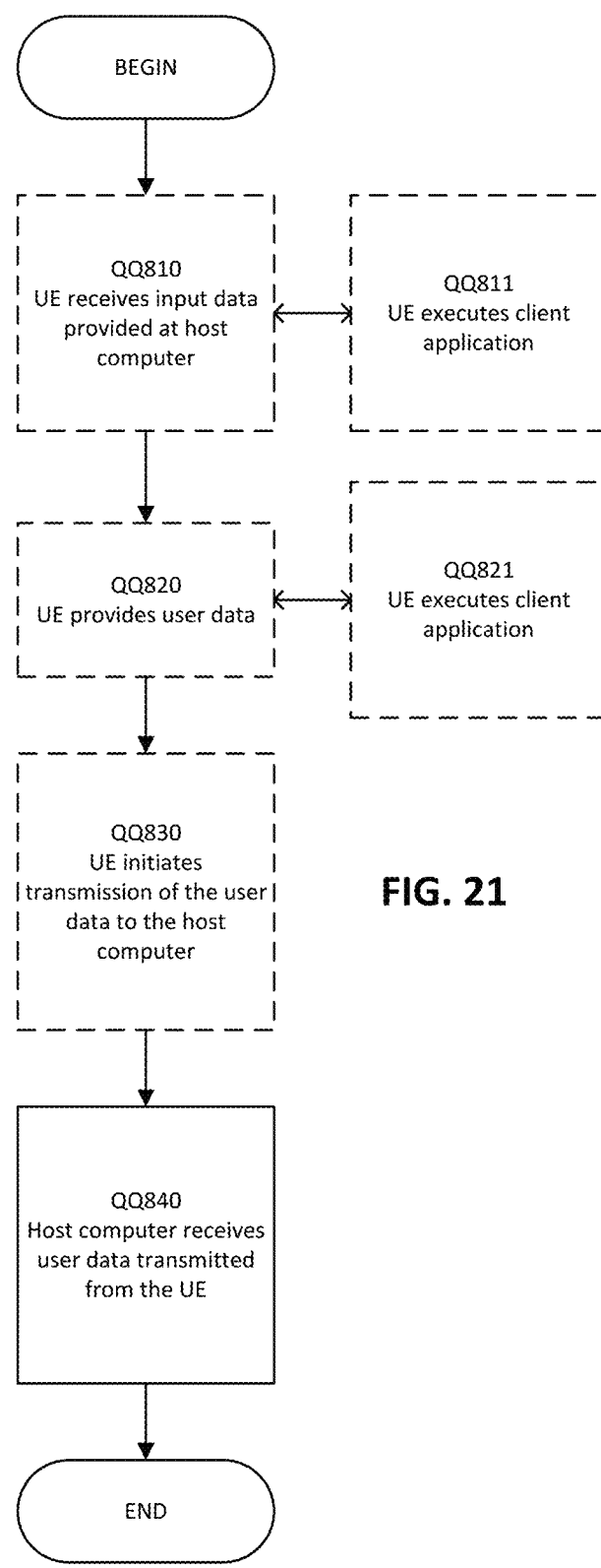
FIG. 21 is a block diagram of methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
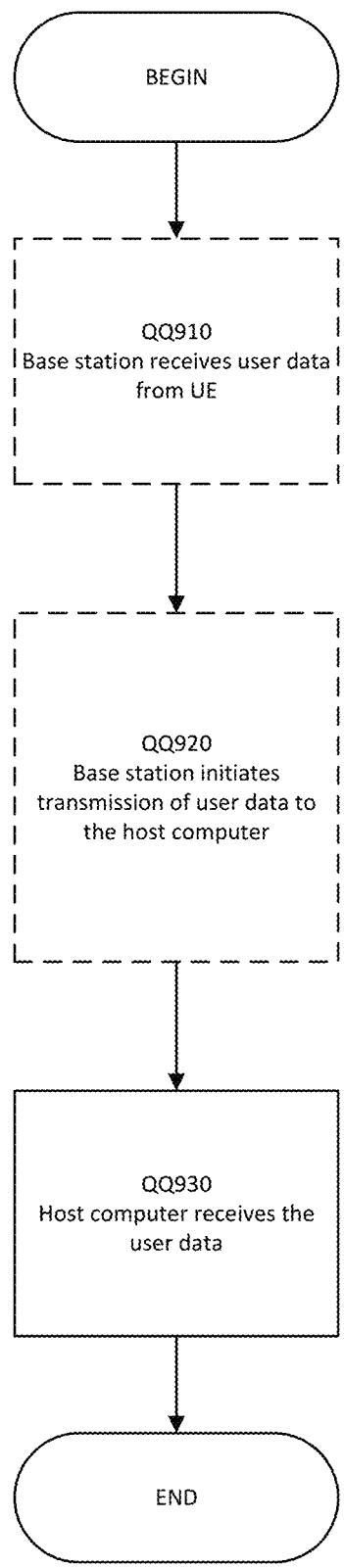
FIG. 22 is a block diagram of methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe MCG Master Cell Group
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Date Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCG Secondary Cell Group
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

APPENDIX (1) Change Request R2-1814666

(2) Change Request R2-1814667

(3) Change Request R2-1814668

3GPP TSG-RAN2 Meeting #103bis  
Chengdu, China, 2018-10-08 to 2018-10-12

R2-1814666

CR-Form-v11.2

CHANGE REQUEST

| 38.331 | CR | CRNum | rev | - | Current version: | 15.3.0 |

*For HELP on using this form: comprehensive instructions can be found at http://www.3gpp.org/Change-Requests.*

Proposed change affects: UICC apps ☐  ME ☒  Radio Access Network ☒  Core Network ☐

| Title: | Secondary node resume in NE-DC and NR-DC |
|---|---|
| Source to WG: | Ericsson |
| Source to TSG: | n.a. (draft CR to be merged into rapporteur's CR when agreed) |
| Work item code: | NR_newRAT-Core | Date: | 2018-09-27 |
| Category: | B | Release: | Rel-15 |
| | Use *one* of the following categories:<br>F (correction)<br>A (mirror corresponding to a change in an earlier release)<br>B (addition of feature),<br>C (functional modification of feature)<br>D (editorial modification)<br>Detailed explanations of the above categories can be found in 3GPP TR 21.900. | | Use *one* of the following releases:<br>Rel-8 (Release 8)<br>Rel-9 (Release 9)<br>Rel-10 (Release 10)<br>Rel-11 (Release 11)<br>Rel-12 (Release 12)<br>Rel-13 (Release 13)<br>Rel-14 (Release 14)<br>Rel-15 (Release 15)<br>Rel-16 (Release 16) |
| Reason for change: | Currently, secondary node resume is supported in LTE but not in NR. To support this, the *sk-Counter*, the secondary *RadioBearerConfig* and the *secondaryCellGroup* need to be included in the *RRCResume* message. Since NE-DC will require the LTE lower layer for the SN, while NR-DC will require NR lower layers, the *RRCResume* message need to be able to include either one of them (i.e. *secondaryCellGroupConfig* or *eutra-SecondaryCellGroupConfig*).<br>In case of NR-DC, the RRC Resume emssage should also inlcude the measurement configurations for the SCG (e.g. *measConfig2*), whereas for NE-DC the SCG ocnfigurations are included in the *RRCConnectionReconfiguration* message included in the *eutra-SecondaryCellGroupConfig*.<br>Since it should be possible to configure, re-configure (delta) or release the SCG configurations (in *secondaryCellGroup* or *eutra-SecondaryCellGroup*) a *mrdc-Release* flag is introduced. If the flag is included, any stored SCG configurations (including *measConfig* and SRB3) are released. Then new SCG configurations can be applied. If the release flag is not included, delta configurations are applicable.<br>Alternatively, the *fullConfig* flag can be set which releases both the SCG and RB config. |
| Summary of change: | RRCResume message and procedures:<br>Added *sk-counter, secondaryCellGroup, mrdc-Release, eutra-SecondaryCellGroup, measConfig2,* and *radioBearerConfig2*.<br><br>The procedures to release the MR-DC configurations are captured in CR R2-1814668. |
| Consequences if not approved: | Configuration of SN will not be possible during RRC Resume |
| Clauses affected: | 5.3.13.4 Reception of the RRCResume by the UE<br>6.2.2 - RRCResume |

| | Y | N | | |
|---|---|---|---|---|
| Other specs affected: (show related CRs) | | X | Other core specifications | TS/TR ... CR ... |
| | | X | Test specifications | TS/TR ... CR ... |
| | | X | O&M Specifications | TS/TR ... CR ... |

Other comments:

START OF FIRST CHANGE

5.3.13.4 Reception of the *RRCResume* by the UE

The UE shall:

1> stop timer T319;

1> if the *RRCResume* includes the *fullConfig*:

>2> perform the full configuration procedure as specified in 5.3.5.11;

1> else:

>2> restore the PDCP state and reset COUNT value for SRB2 and all DRBs;

>2> restore the *cellGroupConfig* from the stored UE AS context;

>2> indicate to lower layers that stored UE AS context is used;

1> discard the *fullI-RNTI*, *shortI-RNTI* and the stored UE AS context, except *ran-NotificationAreaInfo*;

1> if the *RRCResume* includes the *masterCellGroup*:

>2> perform the cell group configuration for the received *masterCellGroup* according to 5.3.5.5;

~~Editor's Note: FFS Whether it is supported to configure *secondaryCellGroup* at Resume.~~

1> if the *RRCResume* includes the *radioBearerConfig*:

>2> perform the radio bearer configuration according to 5.3.5.6;

<u>1>if the *RRCResume* message includes the *sk-Counter*:</u>

><u>2> perform security key update procedure as specified in 5.3.5.7;</u>

<u>1> if the *RRCResume* message includes the *radioBearerConfig2*:</u>

><u>2> perform the radio bearer configuration according to 5.3.5.6;</u>~~Editor's Note: FFS Whether there needs to be a second *radioBearerConfig*.~~

<u>1> if the *RRCResume* message includes the *mrdc-Release*:</u>

><u>2> release the MR-DC configurations as specified in section 5.3.5.10a;</u>

Editor's note: The procedures for MR-DC release are FFS.

<u>1> if the *RRCResume* message includes the *secondaryCellGroup*:</u>

><u>2> perform the cell group configuration for the SCG according to 5.3.5.5;</u>

<u>1> if the *RRCResume* message includes the *measConfig2*:</u>

><u>2> perform the measurement configuration procedure as specified in 5.5.2;</u>

<u>1> if the *RRCResume* message includes the *eutra-secondaryCellGroup*:</u>

><u>2> perform the cell group configuration for the SCG according to TS 36.331 [10], section 5.3.5.4;</u>

1> resume SRB2 and all DRBs;

1> if stored, discard the cell reselection priority information provided by the *cellReselectionPriorities* or inherited from another RAT;

1> stop timer T320, if running;

1> if the *RRCResume* message includes the *measConfig*:

2> perform the measurement configuration procedure as specified in 5.5.2;

1> resume measurements if suspended;

Editor's Note: FFS Whether there is a need to define UE actions related to access control timers (equivalent to T302, T303, T305, T306, T308 in LTE). For example, informing upper layers if a given timer is not running.

1> enter RRC_CONNECTED;

1> indicate to upper layers that the suspended RRC connection has been resumed;

1> stop the cell re-selection procedure;

1> consider the current cell to be the PCell;

1> set the content of the of *RRCResumeComplete* message as follows:

2> if the upper layer provides NAS PDU, set the *dedicatedNAS-Message* to include the information received from upper layers;

2> if the upper layer provides a PLMN, set the *selectedPLMN-Identity* to PLMN selected by upper layers (TS 24.501 [23]) from the PLMN(s) included in the *plmn-IdentityList* in *SIB1*;

2> if the *masterCellGroup* contains the *reportUplinkTxDirectCurrent*:

3> include the *uplinkTxDirectCurrentList*;

1> submit the *RRCResumeComplete* message to lower layers for transmission;

1> the procedure ends.

---

END OF FIRST CHANGE

---

START OF SECOND CHANGE

6.2.2 Message definitions

– RRCResume

The *RRCResume* message is used to resume the suspended RRC connection.

Signalling radio bearer: SRB1

RLC-SAP: AM

Logical channel: DCCH

Direction: Network to UE

***RRCResume* message**

```
-- ASN1START
-- TAG-RRCRESUME-START

RRCResume ::=                        SEQUENCE {
    rrc-TransactionIdentifier            RRC-TransactionIdentifier,
    criticalExtensions                   CHOICE {
        rrcResume                            RRCResume-IEs,
        criticalExtensionsFuture             SEQUENCE {}
```

```
}
}

RRCResume-IEs ::=                      SEQUENCE {
    radioBearerConfig                  RadioBearerConfig
OPTIONAL, -- Need M
    masterCellGroup                    OCTET STRING (CONTAINING CellGroupConfig)
OPTIONAL, -- Need M
    measConfig                         MeasConfig
OPTIONAL, -- Need M
    fullConfig                         ENUMERATED {true}
OPTIONAL, -- Need N lateNonCriticalExtension           OCTET STRING
OPTIONAL,
    nonCriticalExtension               RRCResume-v15xx-IEsSEQUENCE{}
OPTIONAL
}

RRCResume-v15xx-IEs ::=                SEQUENCE {
    radioBearerConfig2-r15x            OCTET STRING (CONTAINING RadioBearerConfig)
OPTIONAL, -- Need M
    sk-Counter-r15x                    INTEGER (0..65535)
OPTIONAL, -- Need N
    mrdc-Release-r15x                  ENUMERATED {true}
OPTIONAL, -- Need N
    secondaryCellGroup-r15x            OCTET STRING (CONTAINING CellGroupConfig)
OPTIONAL, -- Need M
    measConfig2-r15x                   OCTET STRING (CONTAINING MeasConfig)
OPTIONAL, -- Need M
    eutra-SecondaryCellGroup-r15x      OCTET STRING (CONTAINING RRCConnectionReconfiguration)
OPTIONAL, -- Need M
    nonCriticalExtension               SEQUENCE{}
OPTIONAL
}

-- TAG-RRCRESUME-STOP
-- ASN1STOP
```

| RRCResume-IEs field descriptions |
|---|
| masterCellGroup <br> Configuration of the master cell group (NR Standalone or MR-DC): |
| measConfig <br> Configuration of measurements. |
| measConfig2 <br> Configuration of a secondary set of measurements (NR-DC). |
| mrdc-Release <br> A one-shot field indicating whether the UE releases the stored SCG related configuration (e.g. *secondaryCellGroup*, *eutra-SecondaryCellGroup*, SRB3 and SCG *measConfig*). New SCG configurations can then be configured. |
| radioBearerConfig, radioBearerConfig2 <br> Configuration of Radio Bearers (DRBs, SRBs) including SDAP/PDCP. |
| secondaryCellGroup <br> Configuration of NR secondary cell group. |
| eutra-SecondaryCellGroup <br> Includes the LTE *RRCConnectionReconfiguration* message as specified in TS 36.331 [10]. In this version of the specification, the LTE RRC message only includes fields *radioResourceConfigDedicated* (with no PDCP configuration present) and/or *mobilityControlInfo* and/ or *measConfig*. If *eutra-secondaryCellGroup* is configured, the network always includes this field upon MN handover to initiate an LTE SCG reconfiguration with sync and key change. |
| sk-Counter <br> A one-shot counter used upon refresh of S-K$_{gNB}$ or S-K$_{eNB}$ based on the newly derived KgNB during RRC Resume. The field is mandatory present in case of resumption or configuration of MR-DC during RRC resume. Otherwise, the field is absent. |

Editor's Note: FFS Whether secondary group can be resumed.

| *END OF SECOND CHANGE* |
|---|

Chengdu, PR China, 8th – 12th October 2018

| CHANGE REQUEST | | | | | | CR-Form-v11.2 |
|---|---|---|---|---|---|---|
| 36.331 | CR | CRNum | rev | - | Current version: | 15.3.0 |

*For HELP on using this form: comprehensive instructions can be found at http://www.3gpp.org/Change-Requests.*

Proposed change affects: UICC apps ☐  ME ☒  Radio Access Network ☒  Core Network ☐

| Title: | Release of secondary cell group in NE-DC (36.331) | | |
|---|---|---|---|
| Source to WG: | Ericsson | | |
| Source to TSG: | n.a. (draft CR to be merged into rapporteur's CR when agreed) | | |
| Work item code: | LTE_5GCN_connect | Date: | 2018-09-27 |
| Category: | B<br>Use *one* of the following categories:<br>F (correction)<br>A (mirror corresponding to a change in an earlier release)<br>B (addition of feature),<br>C (functional modification of feature)<br>D (editorial modification)<br>Detailed explanations of the above categories can be found in 3GPP TR 21.900. | Release: | Rel-15<br>Use *one* of the following releases:<br>Rel-8 (Release 8)<br>Rel-9 (Release 9)<br>Rel-10 (Release 10)<br>Rel-11 (Release 11)<br>Rel-12 (Release 12)<br>Rel-13 (Release 13)<br>Rel-14 (Release 14)<br>Rel-15 (Release 15)<br>Rel-16 (Release 16) |
| Reason for change: | When a UE configured with NE-DC is instructed to release the secondary cell group, it shall also release the SCG configurations and the *measConfigSCG*.<br><br>A new section is added to model the behavior for EN-DC | | |
| Summary of change: | 5.3.10.x SCG Release<br>- Added section to handle release of SCG in NE-DC<br><br>Corresponding changes are added to 38.331 in R2-1814667. | | |
| Consequences if not approved: | Release of NE-DC is not supported. | | |
| Clauses affected: | 5.3.10.x   – SCG release | | |
| Other specs affected:<br>(show related CRs) | Y \| N<br>  \| X   Other core specifications      TS/TR ... CR ...<br>  \| X   Test specifications              TS/TR ... CR ...<br>  \| X   O&M Specifications               TS/TR ... CR ... | | |
| Other comments: | | | |

*START OF CHANGES*

5.3.10.x  SCG release

The UE shall:

1> as a result of SCG release triggered by NR:

2> release the SCG configuration;

2> stop timer T313 for the corresponding PSCell, if running;

2> stop timer T307 for the corresponding PSCell, if running.

NOTE:    The SCG configuration includes all configurations in the *RRCConnectionReconfiguration* message received from the NR MN.

*END OF CHANGES*

3GPP TSG-RAN2 Meeting #103bis  
Chengdu, China, 2018-10-08 to 2018-10-12

R2-1814668

| | | | | | | CR-Form-v11.2 |
|---|---|---|---|---|---|---|
| CHANGE REQUEST ||||||||
| 38.331 | CR | CRNum | rev | - | Current version: | 15.3.0 |

*For HELP on using this form: comprehensive instructions can be found at http://www.3gpp.org/Change-Requests.*

Proposed change affects: UICC apps ☐   ME ☒   Radio Access Network ☒   Core Network ☐

| Title: | Release of secondary cell group in NR-DC and NE-DC (38.331) |||
|---|---|---|---|
| Source to WG: | Ericsson |||
| Source to TSG: | n.a. (draft CR to be merged into rapporteur's CR when agreed) |||
| Work item code: | NR_newRAT-Core | Date: | 2018-09-27 |
| Category: | B | Release: | Rel-15 |
| | *Use one of the following categories:*<br>F *(correction)*<br>A *(mirror corresponding to a change in an earlier release)*<br>B *(addition of feature),*<br>C *(functional modification of feature)*<br>D *(editorial modification)*<br>Detailed explanations of the above categories can be found in 3GPP TR 21.900. || *Use one of the following releases:*<br>Rel-8  (Release 8)<br>Rel-9  (Release 9)<br>Rel-10 (Release 10)<br>Rel-11 (Release 11)<br>Rel-12 (Release 12)<br>Rel-13 (Release 13)<br>Rel-14 (Release 14)<br>Rel-15 (Release 15)<br>Rel-16 (Release 16) |
| Reason for change: | When the network triggers the UE to release the SCG in MR-DC, the SRB3, SCG measConfig and SCG configurations shall be released. If the UE is in NE-DC, the SCG will be E-UTRA and the release will be configured in 36.331. |||
| Summary of change: | - Secondary cell group release extended to be able to trigger from NR<br><br>- MR-DC release. Added procedure to release the MR-DC configurations<br><br>RRCResume message and procedures:<br><br>Description of how to trigger the MR-DC release are described in CR R2-1814565 for RRC Reconfiguration and CR R2-1814666 for RRC Resume. The procedures in 36.331 to release the SCG in NE-DC changes are described in CR R2-1814667. |||
| Consequences if not approved: | Release of SCG will not be supported in MR-DC |||
| Clauses affected: | 5.3.5.4 Secondary cell group release<br>5.3.5.10a MR-DC release |||
| | Y | N | |
| Other specs affected:<br>(show related CRs) | | X | Other core specifications    TS/TR ... CR ... |
| | | X | Test specifications    TS/TR ... CR ... |
| | | X | O&M Specifications    TS/TR ... CR ... |
| Other comments: | |||

---
START OF FIRST CHANGE
---

5.3.5.4 Secondary cell group release

The UE shall:

1> as a result of SCG release triggered by E-UTRA or NR:

2> reset SCG MAC, if configured;

2> for each RLC bearer that is part of the SCG configuration:

3> perform RLC bearer release procedure as specified in 5.3.5.5.3;

2> release the SCG configuration;

2> stop timer T310 for the corresponding SpCell, if running;

2> stop timer T304 for the corresponding SpCell, if running.

NOTE: Release of cell group means only release of the lower layer configuration of the cell group but the *RadioBearerConfig* may not be released.

---
END OF FIRST CHANGE
---

---
START OF SECOND CHANGE
---

5.3.5.10 EN-DC release

The UE shall:

1> as a result of EN-DC release triggered by E-UTRA:

2> release SRB3 (configured according to *radioBearerConfig*), if present;

2> release *measConfig*;

2> release the SCG configuration as specified in section 5.3.5.4.

5.3.5.10a MR-DC release

The UE shall:

1> release SRB3 (configured according to *radioBearerConfig*), if present;

1> if the UE is configured with NR SCG:

2> release the SCG configuration as specified in section 5.3.5.4;

2> release *measConfig2*;

1> else (the UE is configured with E-UTRA SCG):

2> release the SCG configuration as specified in TS 36.331 [10], section 5.3.10.x to release the E-UTRA SCG;

Editor's note: It is FFS how the E-UTRA SCG is released in 36.331.

*END OF SECOND CHANGE*

The invention claimed is:

1. A method performed by a wireless device for performing reconfiguration and/or resumption of a radio resource control connections while operating in a Multi-Radio Access Technology Dual Connectivity environment, the method comprising:
suspending the wireless device to an inactive mode;
resuming operation of the wireless device from the inactive mode;
receiving an indication to perform one of:
releasing a master cell group and perform a configuration on at least one of one or more radio bearer configurations and a secondary cell group configuration; or
releasing configurations for a master cell group and a secondary cell group and perform a configuration on one or more radio bearer configurations; and
responsive to receiving the indication to release configurations for the master cell group and the secondary cell group and perform configuration on the one or more radio bearer configurations:
releasing the configurations for the master cell group and the secondary cell group; and
performing configuration on the one or more radio bearer configurations.

2. The method of claim 1, further comprising:
responsive to receiving the indication to release the master cell group and perform the configuration on the at least the one or more radio bearer configurations and the secondary cell group configuration:
releasing the master cell group; and
performing the configuration on the at least one of the one or more radio bearer configurations and the secondary cell group configuration.

3. The method of claim 2, further comprising:
performing a cell group configuration for a new master cell group responsive to releasing the master cell group.

4. The method of claim 1, further comprising:
performing a cell group configuration for a new master cell group responsive to releasing the master cell group.

5. The method of claim 1, further comprising:
receiving a reconfiguration indication to release a master cell group and perform a configuration on one or more radio bearer configurations; and
responsive to receiving the reconfiguration indication:
releasing the master cell group and the secondary cell group; and
performing the configuration on the one or more radio bearer configurations.

6. The method of claim 5, further comprising:
performing a cell group configuration for a new master cell group responsive to releasing the master cell group.

7. A wireless device configured to operate in a communication network, the wireless device comprising:
processing circuitry; and
memory coupled with the processing circuitry, wherein the memory includes instructions that when executed by the processing circuitry causes the wireless device to perform comprising:
suspending the wireless device to an inactive mode;
resuming operation of the wireless device from the inactive mode;
receiving an indication to perform one of:
releasing a master cell group and perform a configuration on at least one of one or more radio bearer configurations and a secondary cell group configuration; or
releasing configurations for a master cell group and a secondary cell group and perform a configuration on one or more radio bearer configurations, and
responsive to receiving the indication to release configurations for the master cell group and the secondary cell group and perform configuration on the one or more radio bearer configurations:
releasing the configurations for the master cell group and the secondary cell group; and
performing configuration on the one or more radio bearer configurations.

8. A non-transitory storage medium including program code to be executed by processing of a wireless device configured to operate in a communication network, whereby execution of the program code the wireless to perform operations comprising:
suspending the wireless device to an inactive mode;
resuming operation of the wireless device from the inactive mode;
receiving an indication to perform one of:
releasing a master cell group and perform a configuration on at least one of one or more radio bearer configurations and a secondary cell group configuration; or
releasing configurations for a master cell group and a secondary cell group and perform a configuration on one or more radio bearer configurations, and
responsive to receiving the indication to release configurations for the master cell group and the secondary cell group and perform configuration on the one or more radio bearer configurations:
releasing the configurations for the master cell group and the secondary cell group; and
performing configuration on the one or more radio bearer configurations.

9. The non-transitory storage medium of claim 8, the operations further comprising:
responsive to receiving the indication to release the master cell group and perform the configuration on the at least the one or more radio bearer configurations and the secondary cell group configuration:
releasing the master cell group; and
performing the configuration on the at least one of the one or more radio bearer configurations and the secondary cell group configuration.

10. The non-transitory storage medium of claim 8, the operations further comprising:
performing a cell group configuration for a new master cell group responsive to releasing the master cell group.

11. The non-transitory storage medium of claim 8, the operations further comprising:
performing a cell group configuration for a new master cell group responsive to releasing the master cell group.

12. The non-transitory storage medium of claim 8, the operations further comprising:
receiving a reconfiguration indication to release a master cell group and perform a configuration on one or more radio bearer configurations; and
responsive to receiving the reconfiguration indication:
releasing the master cell group and the secondary cell group; and
performing the configuration on the one or more radio bearer configurations.

13. The non-transitory storage medium of claim 12, the operations further comprising:
   performing a cell group configuration for a new master cell group responsive to releasing the master cell group.

* * * * *